United States Patent
Hwang

(10) Patent No.: US 7,889,165 B2
(45) Date of Patent: *Feb. 15, 2011

(54) FLAT DISPLAY APPARATUS, FABRICATING METHOD, PICTURE QUALITY CONTROLLING METHOD AND APPARATUS THEREOF

(75) Inventor: Jong Hee Hwang, Osan-si (KR)

(73) Assignee: LG Display Co., Ltd., Seoul (KR)

( * ) Notice: Subject to any disclaimer, the term of this patent is extended or adjusted under 35 U.S.C. 154(b) by 1103 days.

This patent is subject to a terminal disclaimer.

(21) Appl. No.: 11/635,694

(22) Filed: Dec. 8, 2006

(65) Prior Publication Data

US 2007/0182914 A1 Aug. 9, 2007

(30) Foreign Application Priority Data

Feb. 6, 2006 (KR) .................. 10-2006-0011238

(51) Int. Cl.
G09G 3/36 (2006.01)
(52) U.S. Cl. .................. 345/88; 345/690; 345/214
(58) Field of Classification Search ........... 345/87–100, 345/204, 214, 690, 698; 349/5, 8, 192; 348/744, 348/758

See application file for complete search history.

(56) References Cited

U.S. PATENT DOCUMENTS 6,574,032 B1 * 6/2003 Roddy et al.

2006/0066547 A1 * 3/2006 Nitta et al. ................. 345/88
2007/0182914 A1 * 8/2007 Hwang ...................... 349/192

FOREIGN PATENT DOCUMENTS

| JP | 11-072805 | 3/1999 |
|---|---|---|
| JP | 2001-305586 | 10/2001 |
| JP | 2006-030362 | 2/2006 |

* cited by examiner

Primary Examiner—Regina Liang
(74) Attorney, Agent, or Firm—McKenna Long & Aldridge LLP

(57) ABSTRACT

A flat panel display device including a linked pixel formed of a first pixel electrically connected to a pixel adjacent to the first pixel; a memory storing the location of a panel defect area, a panel defect compensation data for compensating for a brightness difference of the panel defect area, location data describing a location of the linked pixel, charge characteristic compensation data for compensating for a charge characteristic of the linked pixel; and a compensation circuit to modulate the data to be displayed at the panel defect area using at least one of a frame rate control method and a dithering method and to modulate a charge characteristic of a digital video data to be displayed at the linked pixel based on the location data and the panel defect and charge compensation data stored in the memory.

28 Claims, 39 Drawing Sheets

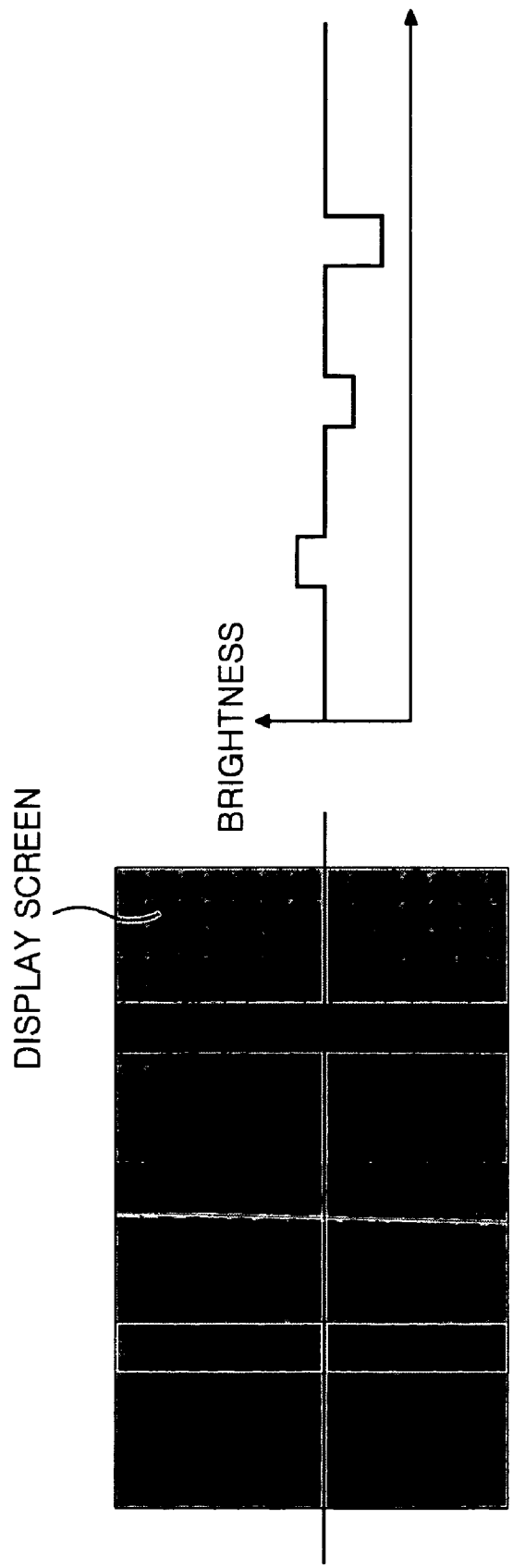

DISPLAY SCREEN

DISPLAY SCREEN

FLAT DISPLAY APPARATUS, FABRICATING METHOD, PICTURE QUALITY CONTROLLING METHOD AND APPARATUS THEREOF

This application claims the benefit of Korean Patent Application No. P2006-0011238, filed on Feb. 6, 2006, which is hereby incorporated by reference for all purposes as if fully set forth herein.

BACKGROUND OF THE INVENTION

1. Field of the Invention

The present invention relates to a display device, and more particularly to a flat panel display device that is adaptive for improving picture quality by use of a repair process and a compensation circuit and a fabricating method thereof, and a picture quality controlling method and apparatus thereof.

2. Discussion of the Related Art

Recently, the use of various flat panel display devices having reduced weight and size compared to cathode rate tube devices, has been on the rise. Flat panel display devices include liquid crystal displays, field emission displays, plasma display panels, and displays employing organic light emitting diodes.

Flat panel display devices include a display panel for displaying a picture and testing processes are used to identify panel defects in the display panel. The panel defects can include defects caused by the difference in the number of lens in an exposure machine and bright spots caused by defective pixels. These panel defects can cause brightness differences on a display screen. In other words, when applying data signals of the same gray level value to each of a panel area having a panel defect and a panel area not having a panel defect, the image displayed in the area having a panel defect can be darker or brighter than the picture displayed in the defect free area, or colors viewed in the defect area and the defect free area may appear to be different. The panel defects are primarily generated in a fabrication process, and may have a fixed form such as dot, line, belt, circle, polygon, or may have one of various other forms related to the cause of panel defect generation. Panel defects of various forms are shown in FIGS. 1A to 1E. Panel defects in the form of vertical belts as shown in FIGS. 1A to 1C result primarily from overlapping exposures and a difference in the number of lenses, while panel defects having a dot shape, as shown in FIG. 1D are primarily the result of impurities. The panel defects might result in a defective product depending on the severity and number of the panel defects, and accordingly panel defects may reduce product yield resulting in increased product cost. Further, even when a unit having a panel defect can be shipped as a good product, the deterioration in picture quality due to the panel defect reduces the reliability of the product. Accordingly, various methods have been proposed in order to reduce the occurrence of the panel defects. The improvement methods of the related art are mainly related to solving problems in the fabrication process, but there is a limit to the amount of reduction of panel effects that can be achieved using the fabrication process solutions of the related art.

A defective pixel appearing as a panel defect of a dot shape may be generated by problems such as impurities present in the fabrication process. The presence of these impurities may cause patterning defects resulting in a short or open of a signal line, a defect in a thin film transistor (hereinafter, referred to as "TFT"), or a defect in an electrode pattern. Picture quality defects caused by the defective pixels may appear as either a dark spot or bright spot on the display screen. Because a bright spot is more readily perceived by the naked eye than a dark spot, for a defective pixel appearing as a bright spot a repair process is used to make the defective pixel appear as a dark spot to reduce the deteriorating effect of the defective pixel on the picture quality. However, while a defective pixel appearing as a dark spot, as shown in FIG. 2A, may be nearly imperceptible on a display screen displaying a the black gray level, a defective pixel on an area of a display screen displaying a medium gray level or a white gray level, as shown in FIGS. 2B and 2C, is clearly perceptible as a dark spot in the middle gray level and in the bright gray level area of the display.

In addition to the problems related to panel defects, a bright line effect associated with the backlight may adversely affect picture quality. The bright line effect is a picture quality defect associated with liquid crystal display devices that employing a backlight, and is generated by a non uniform intensity of the light emitted by the backlight.

FIG. 3 illustrates an example of the bright line effect primarily associated with liquid crystal display devices using a direct type backlight. Backlights of the related art structural improvements to address the bright line problem of the backlight. However, the backlight structures of the related art do not completely address the problem of bright line effects associated with the backlight.

SUMMARY OF THE INVENTION

Accordingly, the present invention is directed to a flat display apparatus, fabricating method, picture quality controlling method and apparatus thereof that substantially obviates one or more of the problems due to limitations and disadvantages of the related art.

An advantage of the present invention is to provide a flat panel display device that is adaptive for improving picture quality by use of a repair process and a compensation circuit and a fabrication method thereof, and a picture quality controlling method and apparatus thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a flat panel display device according to an aspect of the present invention includes: a display panel having a linked pixel the linked pixel including a first pixel electrical connected to an adjacent second pixel; a memory to store: first location data describing the location of a panel defect area of the display panel having a brightness difference in comparison to a normal area of the display driven with the same data as the panel defect area; panel defect compensation data to compensate for the brightness difference of the panel defect area; second location data describing a location of the linked pixel; and charge characteristic compensation data to compensating for a charge characteristic of the linked pixel; and a compensation circuit to modulate data to be displayed at the panel defect area using at least one of a frame rate control method and a dithering method and to modulate a charge characteristic of a digital video data to be displayed at the linked pixel based on the first and second location data and the panel defect and charge compensation data stored in the memory.

In another aspect of the present invention, a fabricating method of a flat panel display device includes applying test data to the flat panel display device; identifying the presence of a defective pixel on the flat panel display device by detecting a difference in brightness of a panel area containing the defective pixel and a normal panel area; forming a linked pixel by electrically connecting an identified defective pixel to a normal pixel adjacent to the identified defective pixel; determining first location data that describes a location of a panel defect area, calculating a panel defect compensation data for compensating a brightness of the panel defect area, determining second location data that describes a location of the linked pixel, and calculating a charge characteristic compensation data for compensating a charge characteristic of the linked pixel; and storing the first and second location data the panel defect compensation data and the charge compensation data in a data modulation memory of the flat panel display device.

In another aspect of the present invention, a picture quality controlling method of a flat panel display device includes: forming a linked pixel by electrically connecting to a defective pixel to a normal pixel adjacent thereto in a display panel of a flat panel display device; determining first location data describing the location of a panel defect area having a brightness difference in comparison with a normal area, a panel defect compensation data for compensating a brightness to be displayed at the panel defect area, second location data describing a location of the linked pixel, and a charge characteristic compensation data for compensating a charge characteristic of the linked pixel; storing the location data and the compensation data in a data modulation memory of the flat panel display; and modulating data to be displayed at the panel defect area with at least one of a frame rate control method and a dithering method and modulating a charge characteristic of the digital video data to be displayed at the linked pixel, by use of the first and second location data and the panel defect and charge compensation data stored in the data modulation memory.

In another aspect of the present invention, picture quality controlling apparatus of a flat panel display device includes: a memory to store first location data describing a location of a linked pixel formed by electrically connecting to a defective pixel to a normal pixel adjacent thereto in a display panel of the flat panel display device, a charge characteristic compensation data for compensating a charge characteristic of the linked pixel, second location data describing the location of a panel defect area having a brightness difference in comparison with a normal area which is displayed with a normal brightness in the display panel, and a compensation data for the panel defect area; a first compensating part to sub-divide the panel defect compensation data with at least one of a frame rate control method and a dithering method and to modulate the data to be displayed at the panel defect area using the sub-divided panel defect compensation data; and a second compensating part to modulate the data to be displayed at the linked pixel among data output by the first compensating part with the charge characteristic compensation data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1A to 1E are diagrams illustrating panel defects having various shapes;

DETAILED DESCRIPTION OF THE ILLUSTRATED EMBODIMENTS

Reference will now be made in detail to embodiments of the present invention, examples of which are illustrated in the accompanying drawings.

Exemplary embodiments of the present invention will be explained as follows with reference to FIGS. 4 to 31 of the accompanying drawings. The description of the embodiments will be made using a liquid crystal display device as an example display device.

Figure 1B:
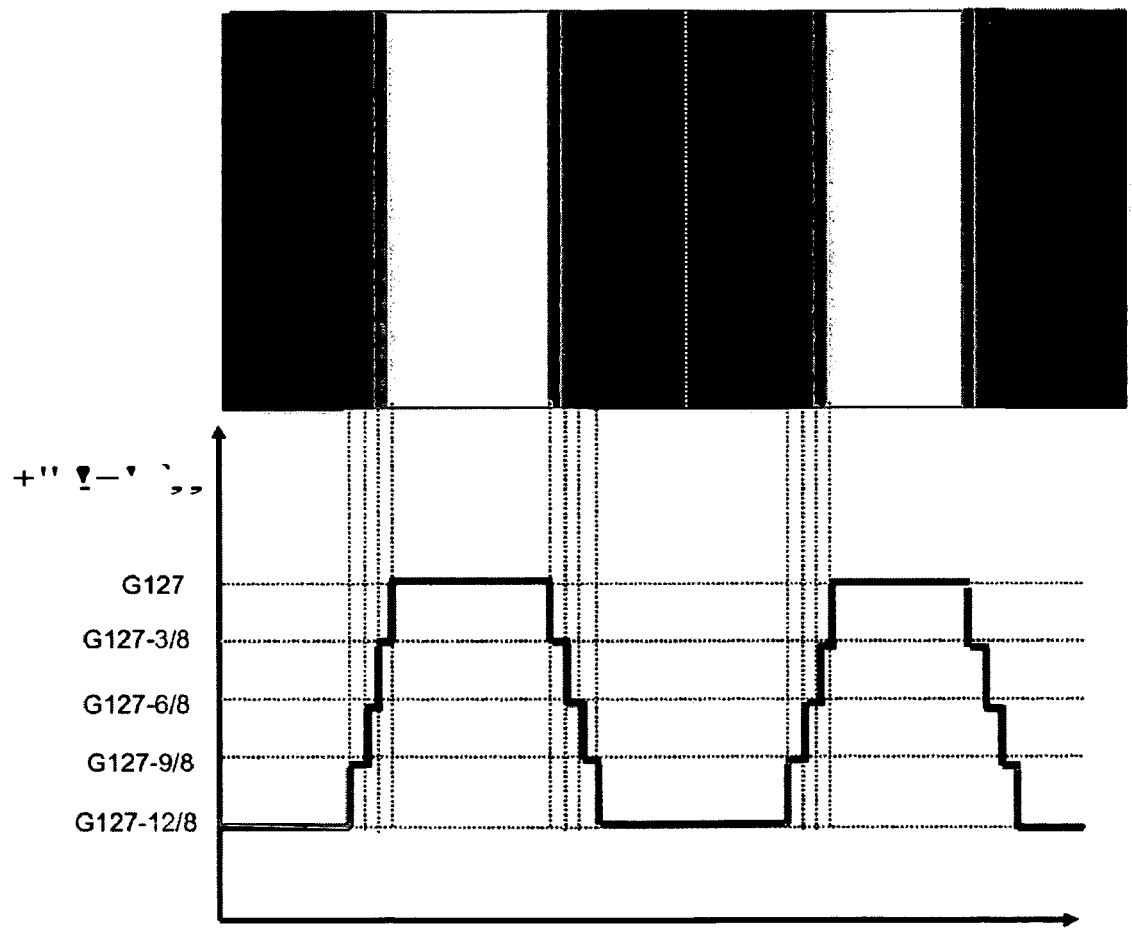
Figure 1C:
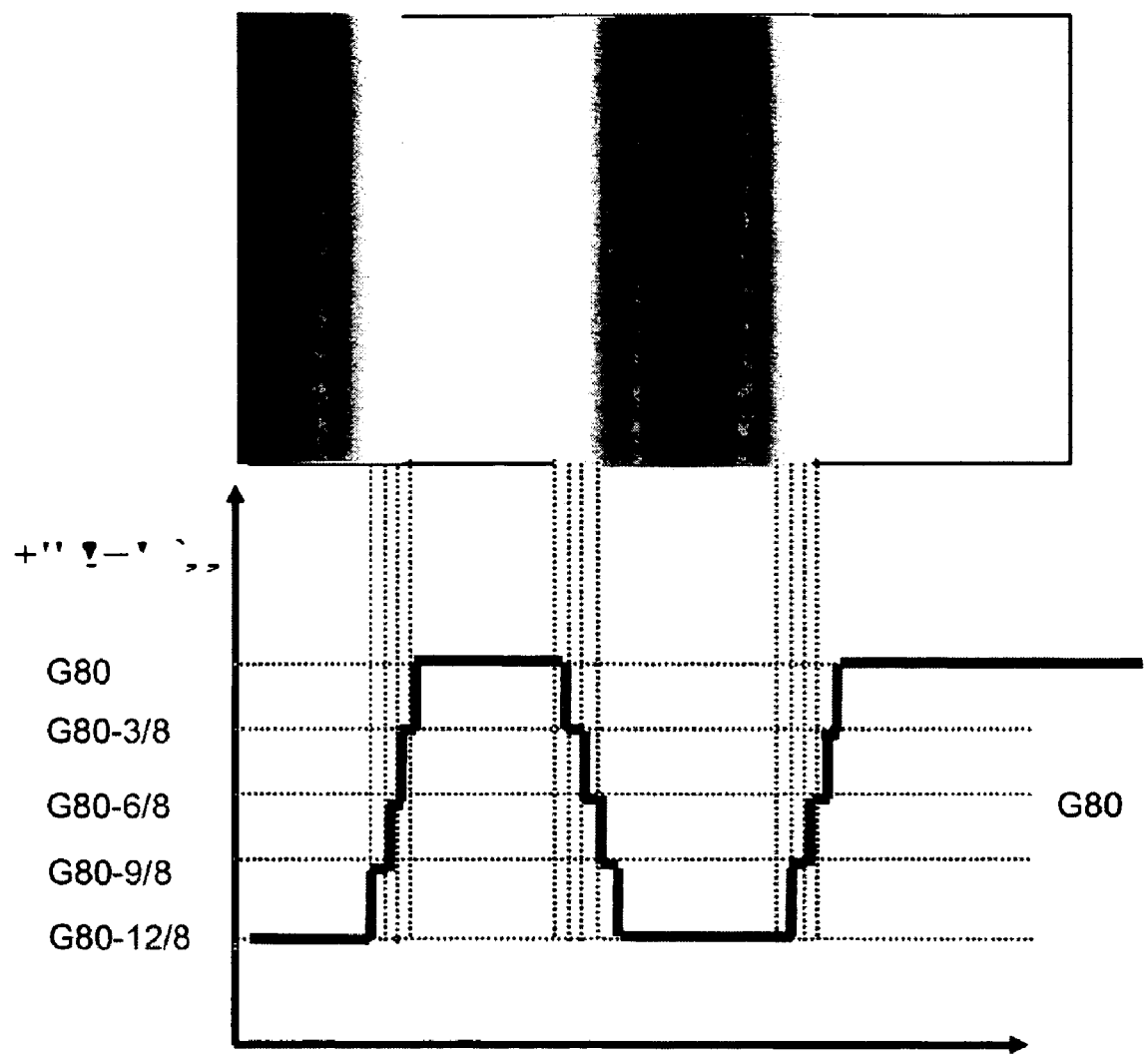
Figure 1D:
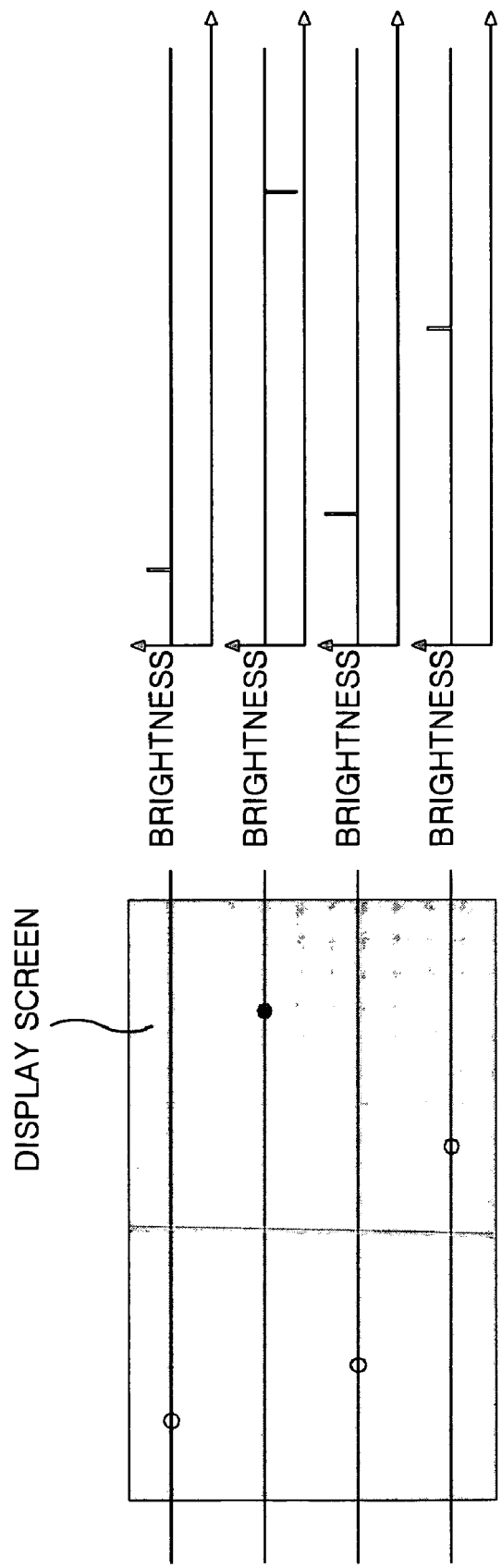
Figure 1E:
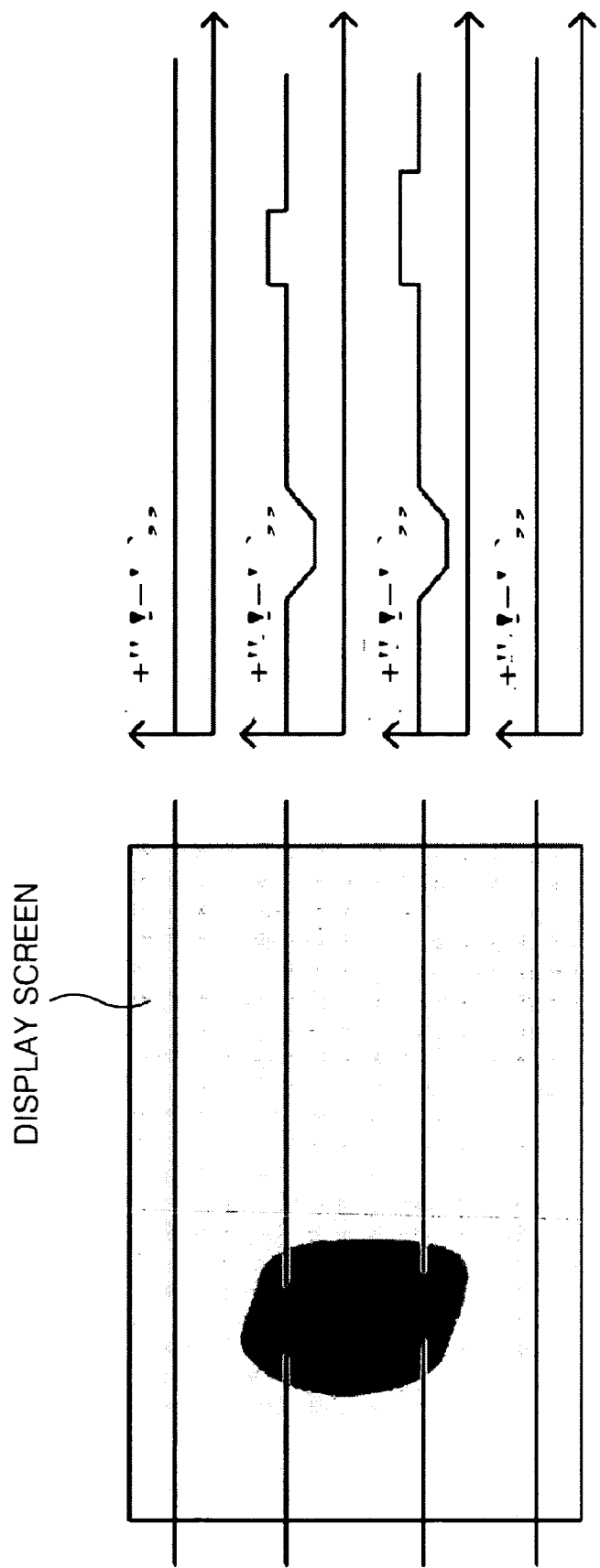
Figure 2A:
FIGS. 2A to 2C are diagrams illustrating the perceptibility of a defective pixel in an image of various gray levels when the defective pixel is made to be a dark spot.
Figure 2B:
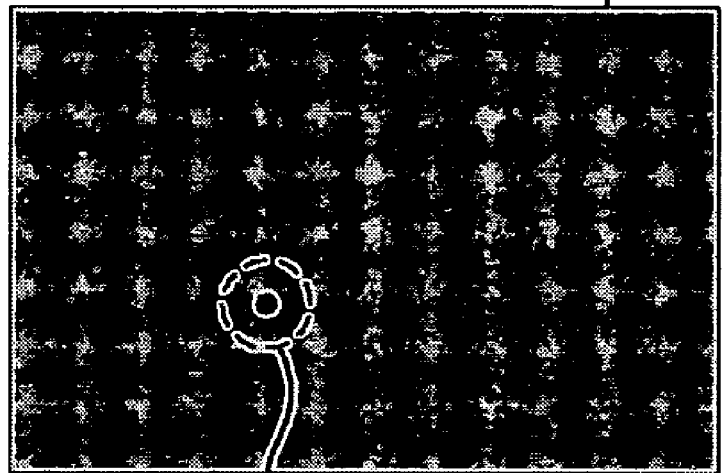
Figure 2C:
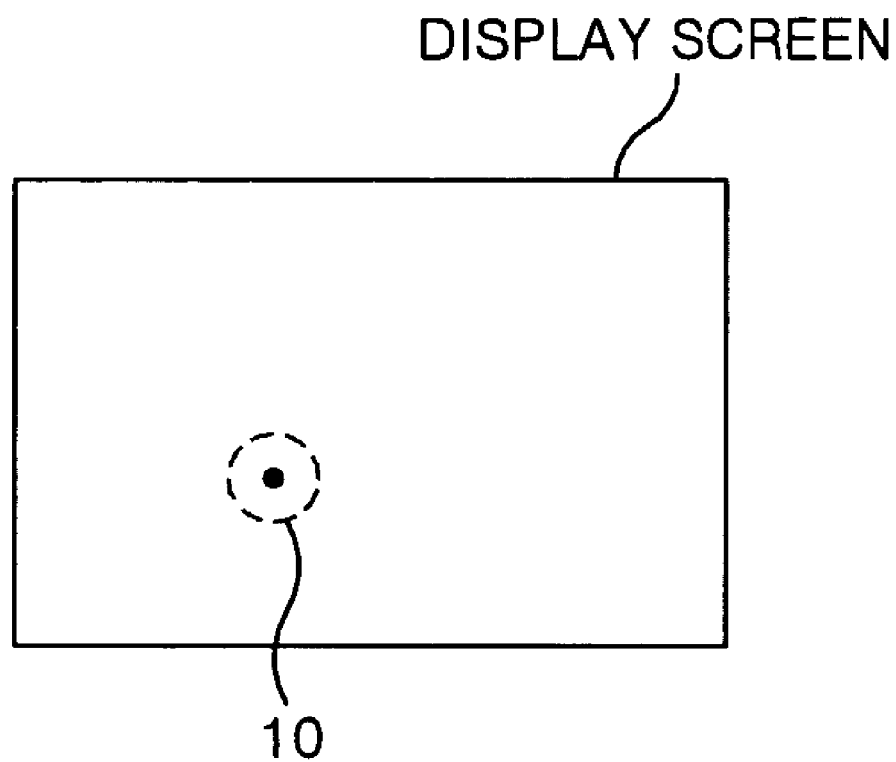
Figure 3:
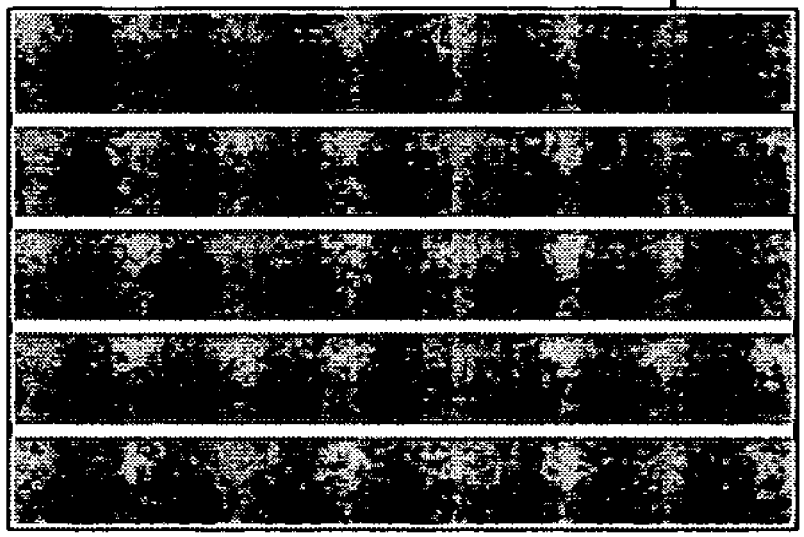
FIG. 3 is a diagram illustrating a picture quality defect by a bright line caused by a backlight.
Figure 4:
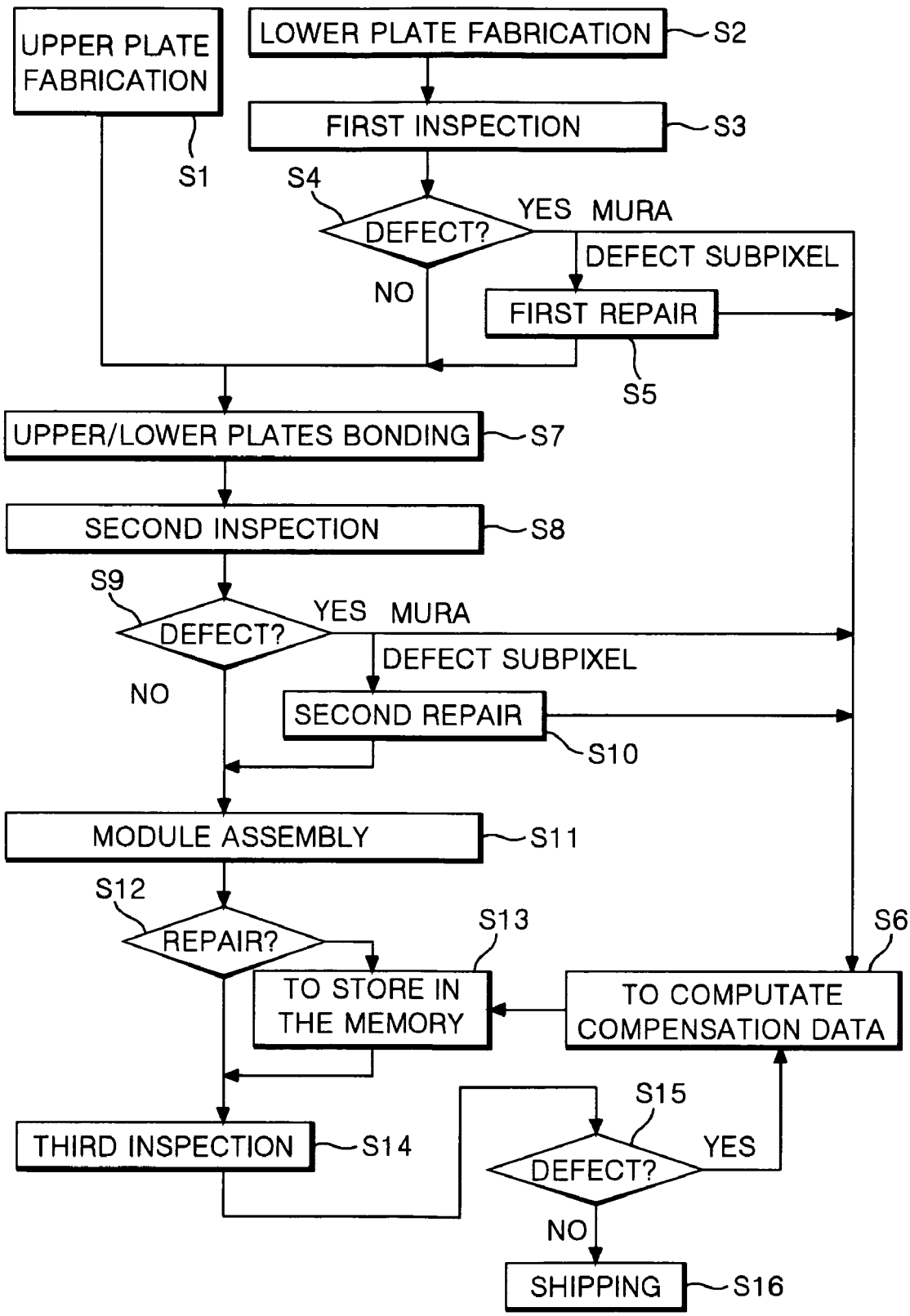
FIG. 4 is a flow chart illustrating a fabricating method of a flat panel display device according to an embodiment of the present invention.

FIG. 4 is a flow chart illustrating a method of fabricating a liquid crystal display device according to an embodiment of the present invention.

Referring to FIG. 4, in a method of fabricating a liquid crystal display device according to an embodiment of the present invention, an upper substrate or plate (color filter substrate) and a lower substrate or plate (TFT array substrate) of a display panel are separately prepared (S1, S2). The steps S1 and S2 for preparing a substrate include a cleaning process, a substrate patterning process, and an alignment film forming/rubbing process. In the substrate cleaning process, impurities on the surfaces of the upper and lower substrates are removed using a cleaning solution. The substrate patterning processes include an upper substrate patterning process and a lower substrate patterning process. In the upper substrate patterning process, there may be formed a color filter, a common electrode, and a black matrix. In the lower substrate patterning process, signal lines such as a data line and a gate line are formed, a TFT is formed at the crossing part of the data line and the gate line, and a pixel electrode is formed near a pixel area provided by the crossing of the data line and the gate line. The lower substrate patterning process may additionally include a process of patterning a conductive link pattern such as the conductive link pattern 123 shown in FIG. 15 for linking a normal sub-pixel 11 to a defective sub-pixel 10 to form a linked sub-pixel. A detailed description for forming a conductive link pattern will be provided later.

After completion of the lower substrate patterning process, a test image is displayed by applying test data including each gray level to the lower substrate of the display panel and an inspection is conducted to detect the presence or absence of a panel defect and presence or absence of a defective sub-pixel using an electrical/magnetic inspection and/or a naked eye inspection of the displayed (S3). A sub-pixel is any one of red R, green G and blue B sub-pixels which compose a pixel. Because pixel defects are detected in units of sub-pixels, the second and third inspection processes (S8, S14) which are described later and first and second repair processes S5, S10 which are described later as well as the first inspection process (S3) are conducted on unit sub-pixels.

Information describing the presence or absence of the panel defects along with information describing the location of a detected panel defect (or panel defect area) are stored by an inspection computer when a panel defect is detected as the result of the first inspection of the step S3 (S4 [yes]). The inspection computer computes panel defect compensation data for each gray level for each location of the panel defect (S6). A detailed description of the panel defect compensation data computation will be made later.

Figure 6:
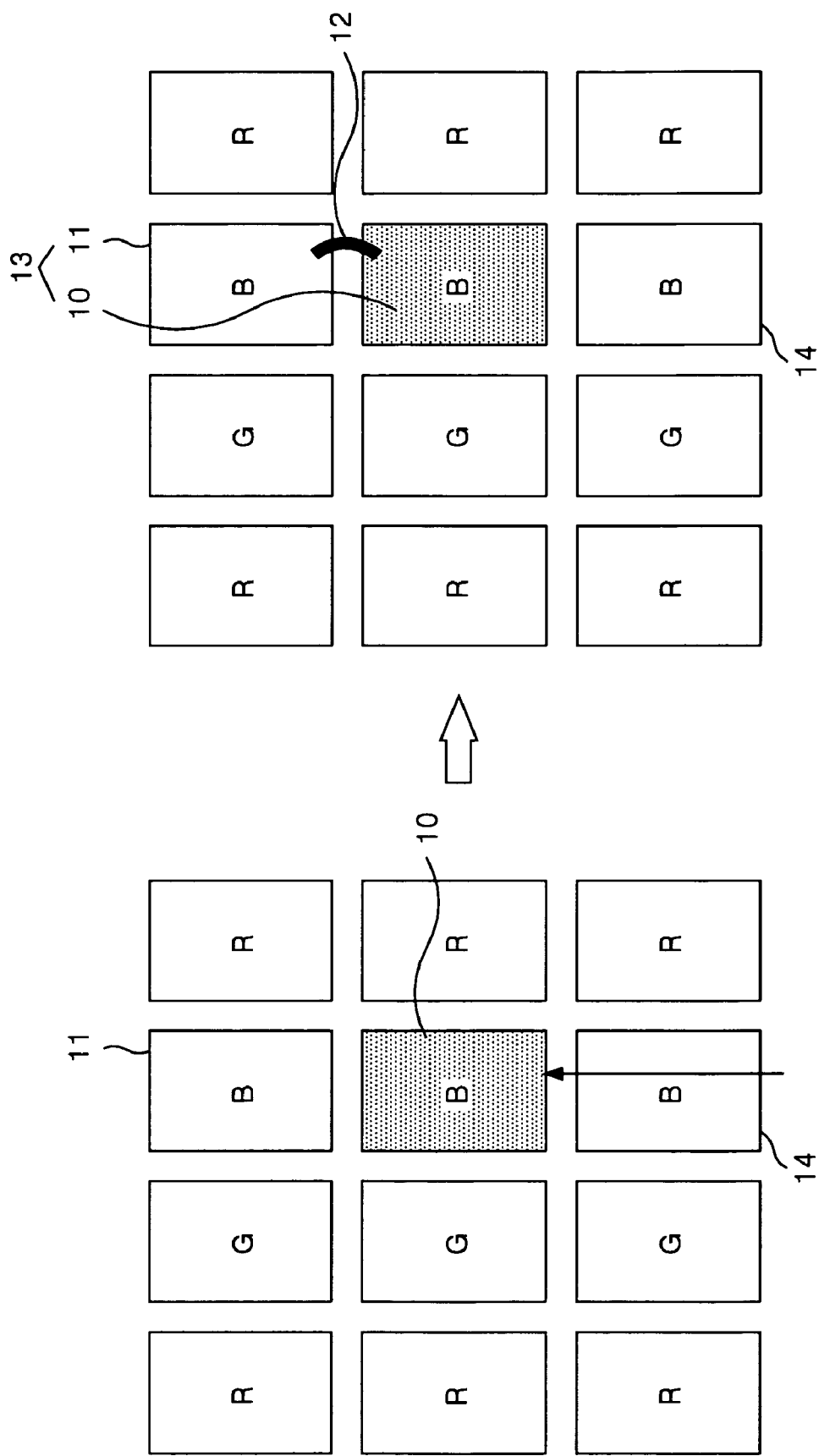
FIG. 6 is a diagram schematically illustrating a repair process according to an embodiment of the present invention.

A first repair process (S5) is performed for the defective sub-pixels detected as the result of the inspection of the first inspection in step S3 (S4 [yes]). As shown in FIG. 6, in the first repair process (S5) a defective sub-pixel 10 may be electrically shorted or linked to a normal sub-pixel 11 adjacent to the defective sub-pixel 10 to form a linked sub-pixel 13. The normal sub-pixel 11 is a pixel for showing the color as intended to be shown by the defective sub-pixel 10. The first repair process S5 includes a process for interrupting a path through which a data voltage is supplied to a pixel electrode of a defective sub-pixel 10 and a process for electrically shorting or linking the normal sub-pixel 11 and the defective sub-pixel 10 by use of a conductive link pattern 12. The processes may be varied to accommodate different processes for forming the conductive link pattern 12 as be described later, including: using a link pattern 44, 104 with a W-CVD (chemical vapor deposition) process; using a link pattern 74 which is pre-formed in the lower substrate fabrication process; and using a head part 133 of the gate line. Accordingly, a brief description for the first repair process S5 will be presented first, and a detailed explanation will provided later in conjunction with a description of embodiments for forming the conductive link pattern 12.

As shown in FIG. 6, in a first repair process S5, the linked sub-pixel 13, formed by electrically connecting the normal sub-pixel 11 and a defective sub-pixel 10 of the same color, is charged with the same data voltage used for charging the linked normal sub-pixel 11. However, the linked sub-pixel 13 has a different charge characteristic than a normal non-linked sub-pixel 14 because for the linked sub-pixel 13, electric charges are supplied to the pixel electrodes included in the two sub-pixels 10, 11 through a single TFT. For example, when the same data voltage is supplied to the linked sub-pixel 13 and the unlinked normal sub-pixel 14, the charge applied to the linked sub-pixel 13 is divided between the two sub-pixels 10, 11, thus the amount of charged electric charge applied to sub-pixel 13 is small in comparison with that supplied to the normal, non-linked sub-pixel 14. As a result, when the same data voltage is supplied to the non-linked normal sub-pixel 14 as to the linked sub-pixel 13, the linked sub-pixel 13 appears brighter than the unlinked normal sub-pixel 11 in a normally white operating mode in which a transmittance or gray level increases with an increase in data voltage. On the other hand, the linked sub-pixel 13 would appear darker than the unlinked normal sub-pixel 14 in a normally black operating mode in which a transmittance or gray level decreases with an increase in the data voltage. Generally a normally white driving mode is sued with a twisted nematic mode device (hereinafter, referred to as "TN mode") in which the pixel electrode and the common electrode of the liquid crystal cell are formed on separate, facing substrates having a liquid crystal formed therebetween and in which a vertical electric field is generated between the pixel electrode and the common electrode, while a normally black driving mode is used with an in-plane switching mode (hereinafter, referred to as "IPS mode") in which the pixel electrode and the common electrode of the liquid crystal cell are formed on the same substrate and a horizontal electric field is generated between the pixel electrode and the common electrode.

After performing the first repair process (S5) for the defective sub-pixel 10, the information describing the location of the linked sub-pixel 13 and information describing the presence or absence of the defective sub-pixel 10 are stored at the inspection computer and the inspection computer computes the charge characteristic compensation data for each gray level for each location of a linked sub-pixel 13 (S6). The charge characteristic compensation data are data for compensating a charge characteristic of the linked sub-pixel 13. A detailed description for method of determining the charge characteristic compensation data will be described later.

After the charge characteristic data is computed, the upper and lower substrates are bonded together with frit glass or other sealant (S7). The bonding process includes a forming and rubbing process for an alignment film and a substrate bonding and liquid crystal injecting process. In the alignment film forming and rubbing process, an alignment film is coated on each of the upper substrate and the lower substrate of the display panel, and the coated alignment film is rubbed with a rubbing cloth. In the substrate bonding and liquid crystal injecting process, the upper substrate and the lower substrate are bonded together using a sealant and liquid crystal and spacers are injected through a liquid crystal injection hole, and the liquid crystal injection hole is sealed.

After the upper and lower substrates are bonded together to form a display panel, a second inspection process including displaying a test image, and performing an inspection to detect the presence or absence of panel defects and the presence or absence of defective sub-pixel is performed using a electrical/magnetic inspection and/or a naked eye inspection of the test image (S8).

Information describing the presence or absence of the panel defects (or panel defect areas) along with information describing the location of any panel defects are stored at an inspection computer when a panel defect is detected as the result of the second inspection of the step S8 (S9 [yes]). The inspection computer then computes panel defect compensation data for each gray level for each location having a panel defect (S6).

A second repair process (S10) is performed for the detected defective sub-pixels. The second repair process (S10) includes electrically shorting or linking a defective sub-pixel 10 with a normal sub-pixel 11 which is adjacent to the defective sub-pixel 10 and which displays the same color as the defective sub-pixel 10 in the same manner as described for the first repair process. The first repair process S5 and the second repair process S10 may be identical or they may be different corresponding to the embodiments used for forming the conductive link pattern 12 to be described later. Accordingly, a detailed description for the second repair process S10 will be made in detail in conjunction with a description of the embodiments for forming the conductive link pattern 12.

After performing the second repair process (S10) for defective sub-pixels 10, the information describing the location of the linked sub-pixels 13 and the information describing the presence or absence of the defective sub-pixel 10 are stored at the inspection computer, and the inspection computer computes the charge characteristic compensation data for each gray level for each location of the linked sub-pixels 13 (S6).

Subsequently, a drive circuit is mounted on the display panel and the drive panel and drive circuit are loaded into a case in which the drive circuit is mounted, and in which a backlight, and other components are provided in a module assembly process (S11). In the drive circuit mounting process an output terminal of a tape carrier package (hereinafter, referred to as "TCP") on which the integrated circuits (ICs) including a gate drive IC and a data drive IC are mounted is connected to a pad part of the substrate, and an input terminal of the TCP is connected to a printed circuit board (hereinafter, referred to as "PCB") on which a timing controller is mounted. A non-volatile memory in which the location data of the panel defects and/or the linked sub-pixels and the panel defect compensation data and/or charge characteristic compensation data are stored is mounted on the PCB. A compensation circuit for modulating digital video data that to be supplied to the panel defect and/or the linked sub-pixel 13 using data stored in the non-volatile memory is also mounted on the PCB. EEPROM (electrically erasable programmable read only memory) may be used as the non-volatile memory. The compensation circuit may be integrated with or embedded in the timing controller. The drive integrated circuits may be directly mounted on the substrate by a chip-on-glass (COG) rather than being mounted using a tape automated bonding (TAB) method employing a tape carrier package.

After completing the module assembly, an evaluation is performed to determine whether panel defects and/or defective sub-pixels exist in the display panel by analyzing the information describing the presence or absence of panel defects and/or the defective sub-pixels stored by the inspection computer. If panel defects and/or defective sub-pixels exist in the display panel (S12 [yes]), the location data of the panel defects and/or the linked sub-pixel are stored at the inspection computer and the panel defect compensation data and/or the charge characteristic compensation data computed by the inspection computer are stored in the EEPROM (S13). Alternatively, this evaluation may be performed prior to performing the module assembly.

The inspection computer supplies the location data and compensation data to the EEPROM by use of a ROM recorder. The ROM recorder may transmit the location data and the compensation data to the EEPROM through a user connector. The compensation data are transmitted in series through the connector. Additional signals such as a serial clock, a power source, and a ground power source, may be transmitted to the EEPROM through the connector.

Figure 5:
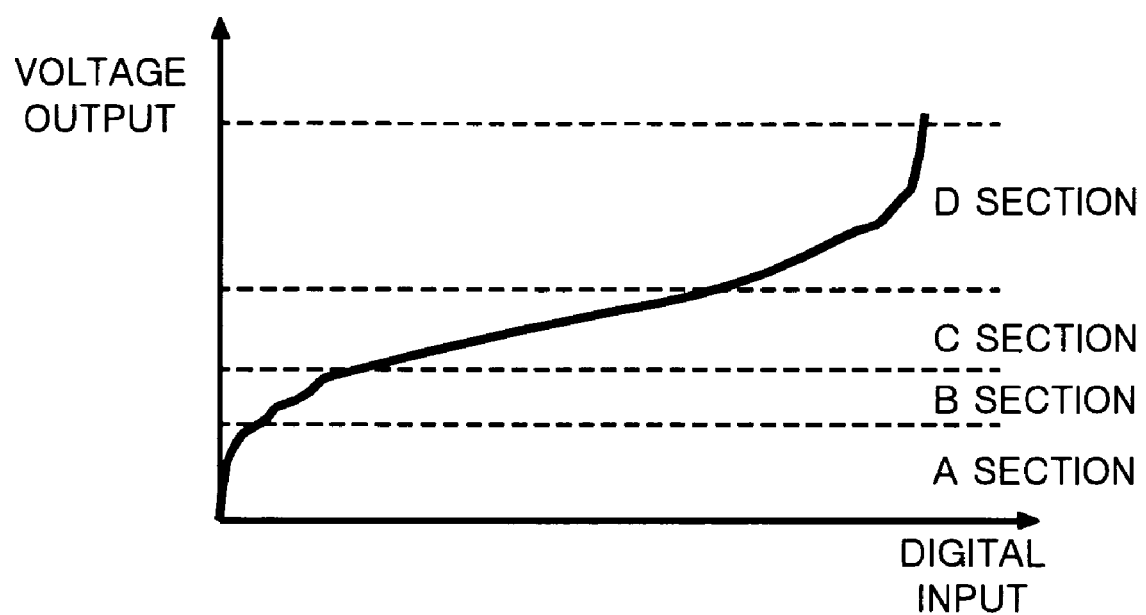
FIG. 5 is a graph illustrating a gamma characteristic for a flat panel display device.

Each compensation value in the panel defect compensation data computed by the inspection computer, i.e., the panel defect compensation data stored at the EEPROM, may be optimized for the particular panel defect location because the degree of brightness difference or color difference when compared to a non-defective area varies in accordance with the location of the panel defect. Further, as illustrated in FIG. 5, the compensation value should be optimized considering a gamma characteristic of the display panel. Accordingly, the compensation value may be established for each gray level in each of R, G, B sub-pixels or a common compensation value may be established for each gray level range (A, B, C, D), with each range including a plurality of gray levels, as shown in FIG. 5. For example, the compensation value may be set to be an optimized value for each location, such as '+1' at the location of 'panel defect 1', '−1' at the location of 'panel defect 2', '0' at the location of 'panel defect 3', and also may be set to be an optimized value for each gray level range such as '0' at the 'gray level range A', '0' at the 'gray level range B', '1' at the 'gray level range C' and '1' at the 'gray level range D'. Accordingly, the compensation value may be made different for each gray level or gray level range at a particular panel defect location, and may also be made different for each panel defect location at a given gray level. The compensation value may be set have the same value in each of the R, G, B data of one pixel when correcting brightness and is set by the unit of one pixel inclusive of the R, G, B sub-pixels. Further, the compensation value may be differently set in each of the R, G, B data when correcting for a color difference. For example, if red is displayed more prominently at a specific panel defect location than at a non defective location, the R compensation value may be lower than the G and B compensation values.

In addition, the charge characteristic of the linked sub-pixel 13 varies in the degree of the brightness difference or color difference compared to the unlinked normal sub-pixel 14 depending on the location of the linked sub-pixel 13, and the compensation value of the charge characteristic compensation data stored at the EEPROM should be optimized for each location of a linked sub-pixel 13. In addition, the compensation value of the charge characteristic compensation data stored in the EEPROM may be different for each gray level for the linked sub-pixel 13 to have the same gray level expression ability as the gray level expression ability of the unlinked normal sub-pixel 14, or may be different for each gray level range covering a plurality of gray levels.

Alternatively, EDID ROM (extended display identification data ROM) may be used as the non volatile memory instead of EEPROM. Monitor information data such as seller/manufacturer identification information (ID), variables and characteristics of a basic display device, may be stored in the EDID ROM. The location data and the compensation data are stored at a separate storage space from the storage space at which the monitor information data are stored. In case of storing the compensation data at the EDID ROM instead of the EEPROM, the ROM recorder transmits the compensation data through a DDC (data display channel). Accordingly, when using the EDID ROM, the EEPROM and the user connector may be omitted reducing development cost. Alternatively, other kinds of non volatile memory in which the stored data can be erased and reloaded can also be used in place of EEPROM and EDID ROM as the non volatile memory for storing the location data and the compensation data.

Subsequently, digital video data to be supplied to the linked sub-pixel 13 and/or the panel defect location are modulated by use of the location data and the compensation data stored at the EEPROM. The modulated data is then supplied to the liquid crystal display device to display a test image, and a third inspection for image quality defects is performed using an electrical/magnetic inspection and/or a naked eye inspection of the test image (S14).

If a picture quality defect is detected as the result of the third inspection of the step of S14 (S15 [yes]), information describing the location at which the picture quality defect appears is stored at the inspection computer, and the inspection computer computes the compensation data for the picture quality defect for each gray level for the location at which the picture quality defect appears (S6). The compensation data computation for the picture quality defect is combined with the compensation data for the foregoing panel defect and/or linked sub-pixel, and the location data for the picture quality defect and the computed compensation data are stored in the EEPROM (S13). The picture quality defects detected by the third inspection of the step of S14 may include bright line defects associated with the backlight and may include other defects such as panel defects and/or effects associated with a linked sub-pixel for which the compensation values have not been optimized.

The liquid crystal display device is identified as an acceptable product for shipping when image quality defects are not detected as the result of the third inspection of the step of S14 (S15 [no]). In other words the liquid crystal device is deemed to be acceptable if the severity of picture quality defects is identified as not being greater than an allowable reference value for a good product (S16). On the other hand, if upon driving the liquid crystal display device with the modulated data, a display quality defect such as a backlight light bright line is generated, the location of the display quality defect and the compensation data associated with the location of the display defect are stored in the EEPROM.

FIGS. 7 to 17 illustrate various embodiments of a conductive link pattern usable in the first and second repair processes (S5, S10).

Figure 7:
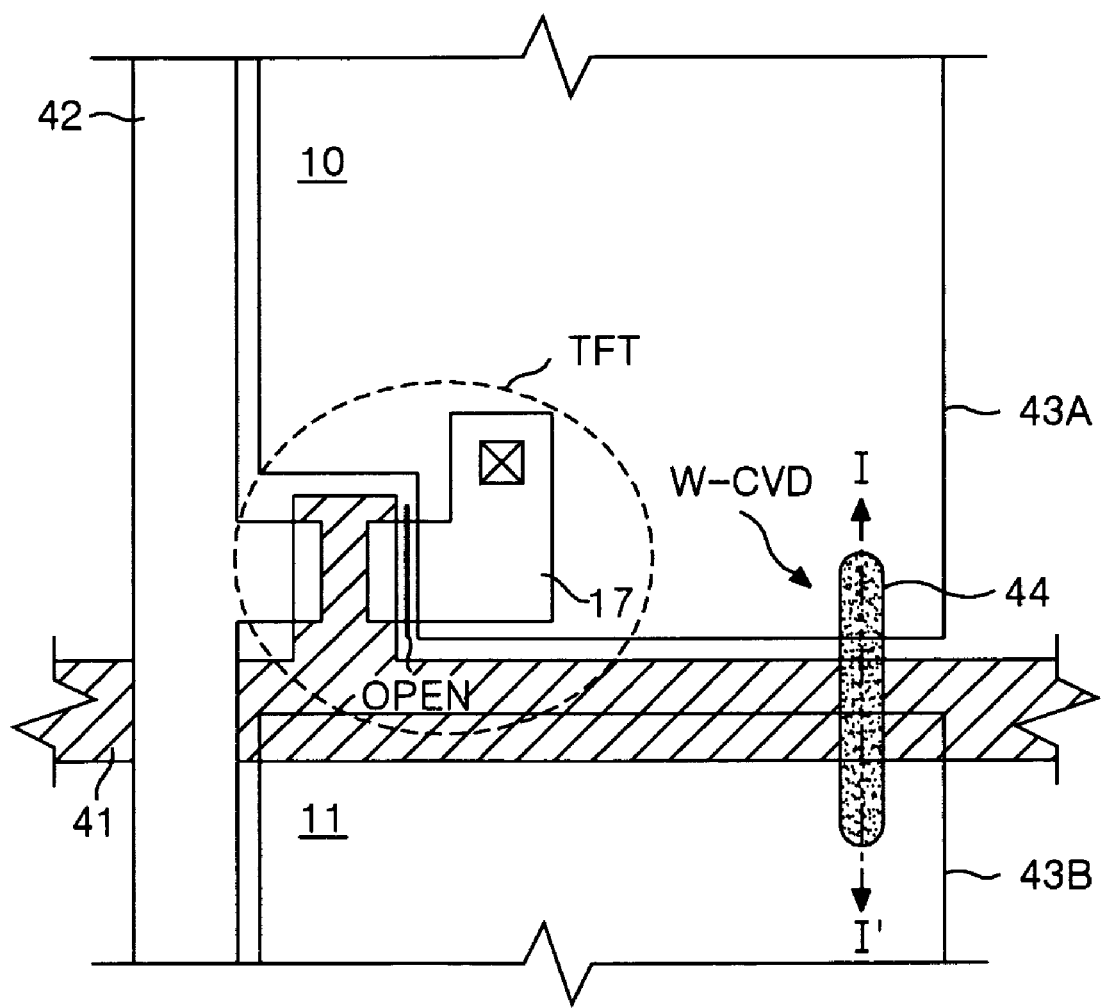
FIG. 7 is a plan view showing a defective pixel and a normal pixel of the same color, which is adjacent thereto, in order to explain a repair process according to a first embodiment of the present invention.
Figure 8:
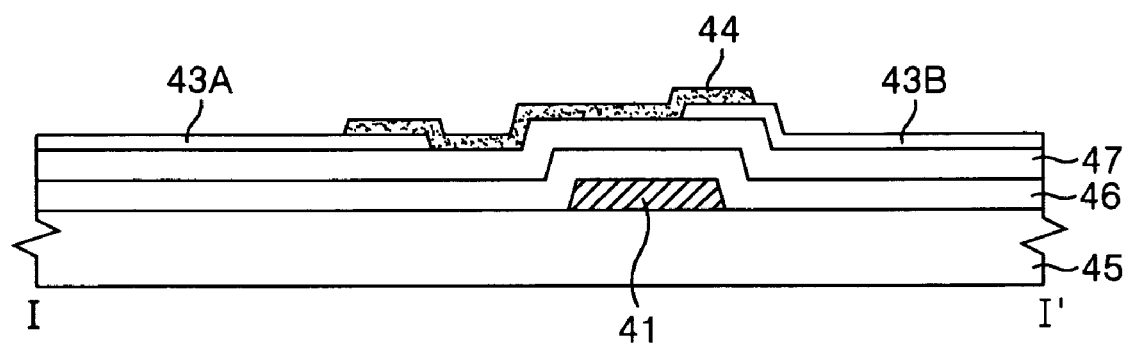
FIG. 8 is a cross sectional diagram showing the defective pixel and an adjacent normal pixel of the same color after the repair process viewed along the line I-I' of FIG. 7.
Figure 9:
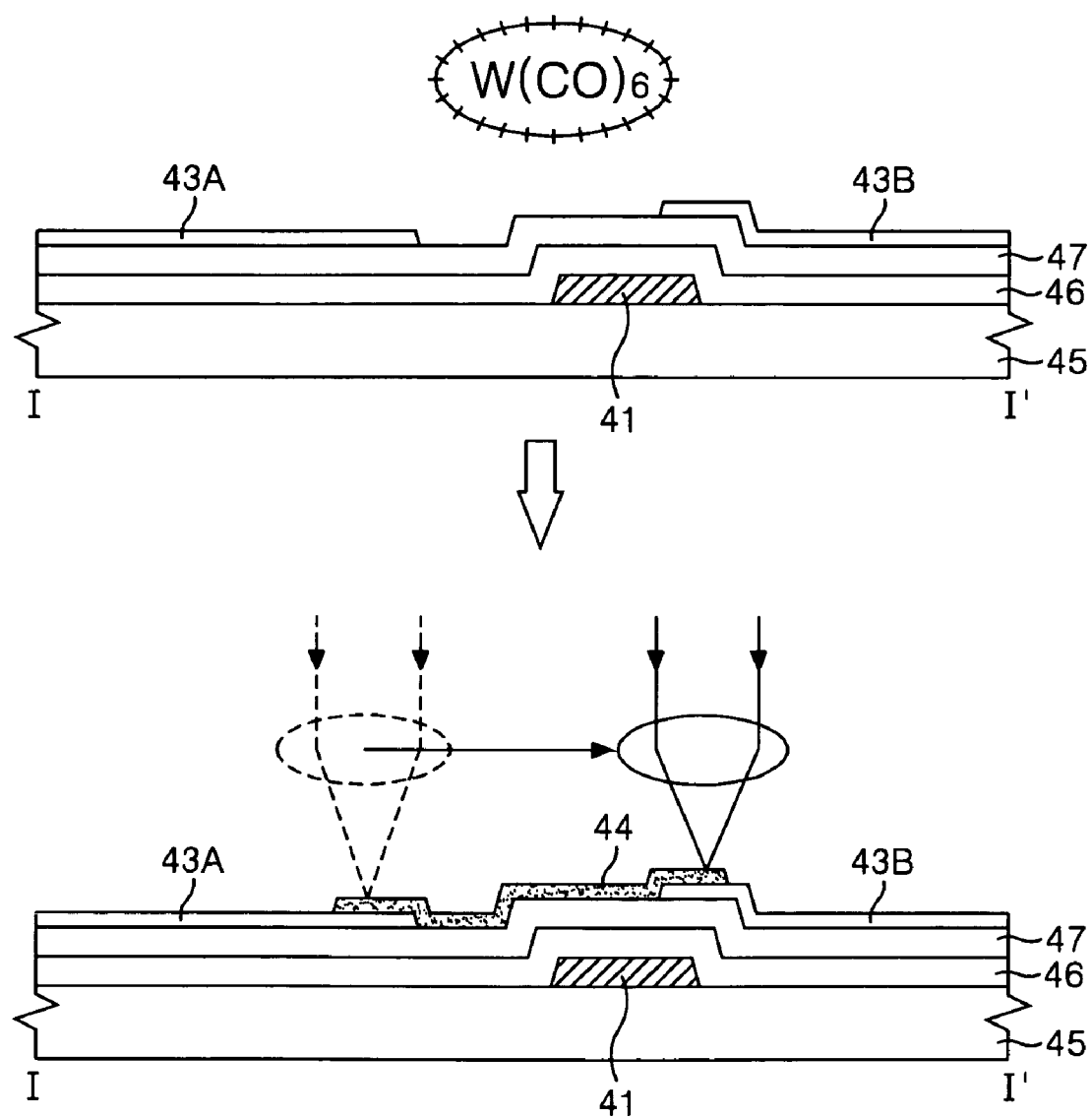
FIG. 9 is a cross sectional diagram illustrating a W-CVD process of the repair process according to the first embodiment of the present invention.

FIGS. 7, 8, and 9 illustrate a repair process of a liquid crystal display device of TN mode according to a first embodiment of the present invention.

Referring to FIGS. 7, 8, and 9, the repair process according to a first embodiment of the present invention includes forming a link pattern 44 on a pixel electrode 43A of the defective sub-pixel 10 and a pixel electrode 43B of the normal sub-pixel 11 adjacent to the pixel electrode 43A of the defective sub-pixel 10 by use of a tungsten chemical vapor deposition (W-CVD) process.

A gate line 41 and a data line 42 cross each other on a glass substrate 45 of the lower substrate and a TFT is formed at the crossing of the gate line 41 and the data line 42. The gate electrode of the TFT is electrically connected to the gate line 41, and the source electrode of the TFT is electrically connected to the data line 42. Additionally, the drain electrode of the TFT is electrically connected to the pixel electrodes 43A, 43B through a contact hole.

A gate metal pattern including the gate line 41, a gate electrode of the TFT, is formed on the glass substrate 45 using a gate metal deposition process using metals such as aluminum Al and aluminum neodymium AlNd, a photolithography process, and an etching process.

A source/drain metal pattern including a data line 42, and source and drain electrodes of the TFT, is formed on a gate insulating film 46 by a source/drain metal deposition process using metals such as chrome Cr, molybdenum Mo, and titanium Ti, a photolithography process and an etching process.

The gate insulating film 46 for electrically insulating the gate metal pattern from the source/drain metal pattern is formed of an inorganic insulating film such as silicon nitride SiNx or silicon oxide SiOx. A passivation film 47 covering the TFT, the gate line 41 and the data line 42 may be formed of either an inorganic insulating film or an organic insulating film.

The pixel electrodes 43A, 43B are formed on the passivation film by depositing a transparent conductive metal such as indium tin oxide ITO, tin oxide TO, indium zinc oxide IZO or indium tin zinc oxide ITZO, and performing a photolithography process and an etching process. During operation of the liquid crystal device, a data voltage is supplied to the pixel electrodes 43A and 43B from the data line 42 through the TFT for a scanning period while the TFT is turned on.

The repair process may be performed on the lower substrate prior to performing the substrate bonding and liquid crystal injecting process. The repair process includes opening an existing path between either the source electrode of the TFT and the data line 42 or between the drain electrode of the TFT and the pixel electrode 43A using a laser cutting process. Opening either of the described paths interrupts the current path to the pixel electrode 43A via the TFT of the defective sub-pixel 10. The repair process further includes directly depositing tungsten W onto the pixel electrode 43A of the defective sub-pixel 10, onto a pixel electrode 43B of the normal sub-pixel 11 of the same color as and adjacent to the defective sub-pixel 10, and onto the passivation film 47 between the pixel electrodes 43A, 43B to form the link pattern 44 using a W-CVD process. The path opening process may be performed prior to or after the W-CVD process.

The W-CVD process includes directing a laser light onto one of the pixel electrodes 43A and 43B under a $W(CO)_6$ atmosphere, and then moving or scanning the directed laser along a scan path to the other of the pixel electrodes 43A and 43B. Tungsten (W) is separated from the $W(CO)_6$ atmosphere in a reaction with the laser light, and the separated tungsten is deposited onto the pixel electrodes 43A, 43B and onto the passivation film 47 therebetween along the scan path of the laser light.

Figure 10:
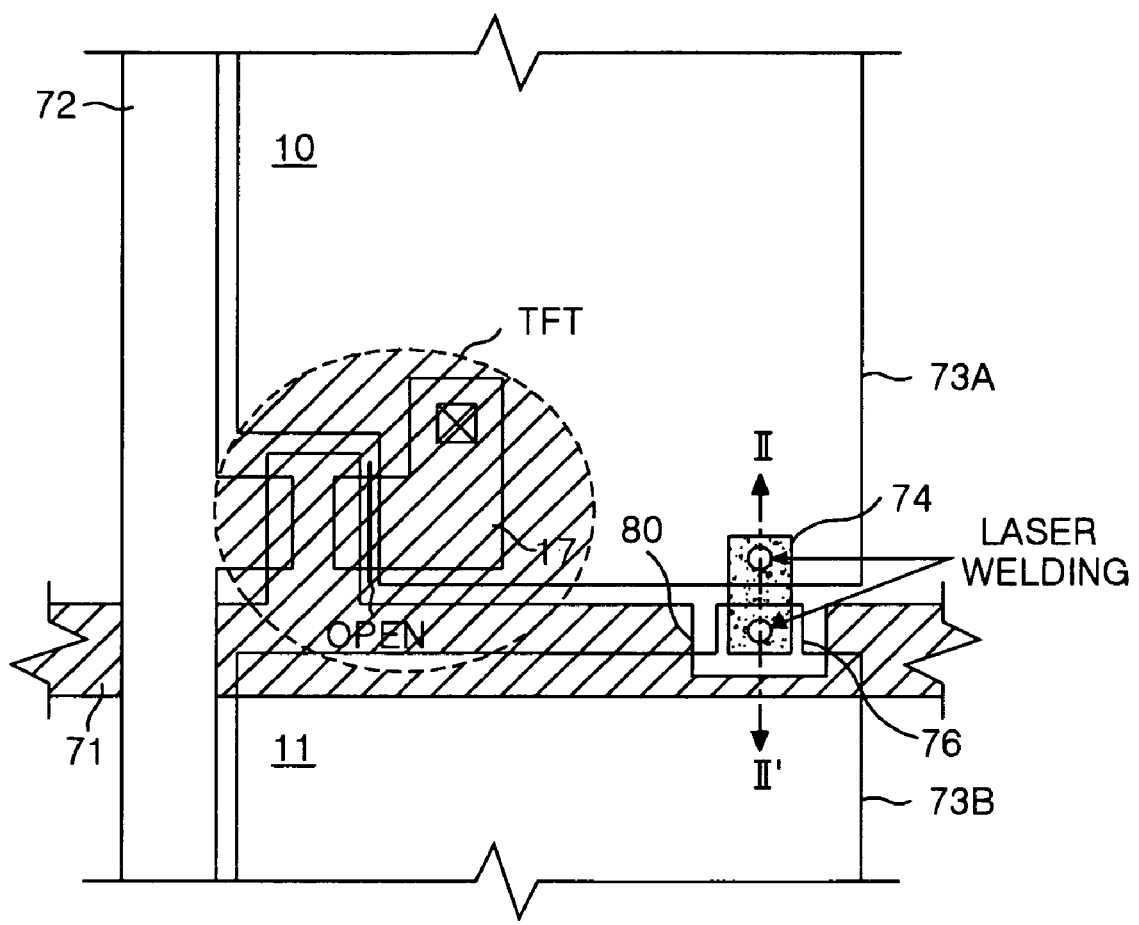
FIG. 10 is a plan view showing a defective pixel and an adjacent normal pixel of the same color for explaining a repair process according to a second embodiment of the present invention.
Figure 11:
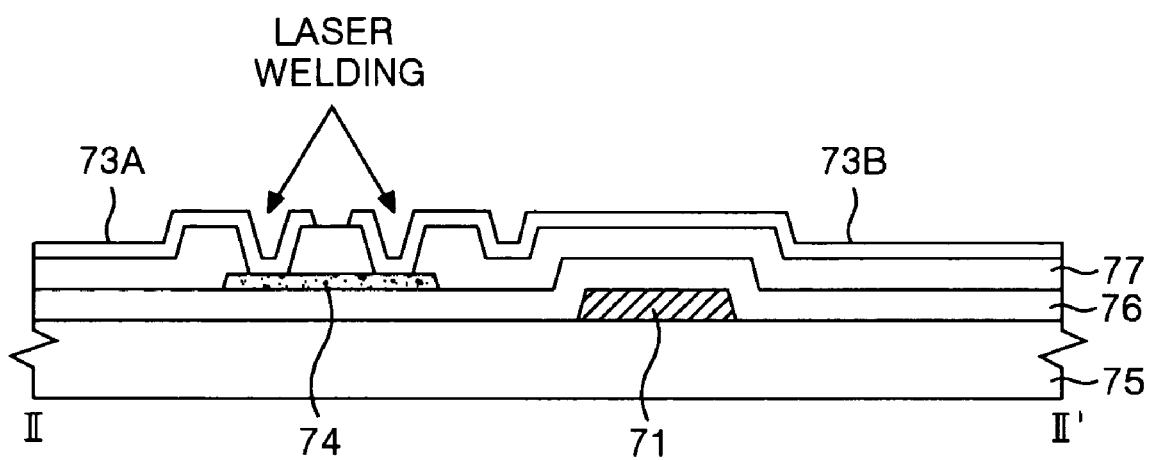
FIG. 11 is a cross sectional diagram showing the defective pixel and an adjacent normal pixel of the same color after the repair process vied along the line II-II' of FIG. 10.
Figure 12:
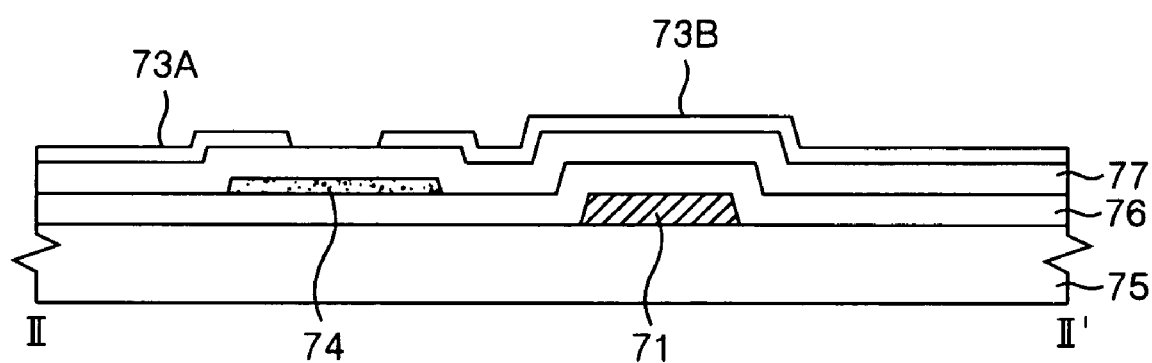
FIG. 12 is a cross sectional diagram showing the defective pixel and the normal pixel of the same color, which is adjacent thereto viewed along the line II-II' in FIG. 10 before the repair process.

FIGS. 10, 11, and 12 illustrate a repair process of a liquid crystal display device of TN mode according to a second embodiment of the present invention.

Referring to FIGS. 10, 11, and 12, the repair process according to the second embodiment of the present invention includes forming a link pattern 74 overlapped with a pixel electrode 73A of the defective sub-pixel 10 and a pixel electrode 73B of the normal sub-pixel 11 which is adjacent thereto with a passivation film 77 therebetween.

A gate line 71 and a data line 72 cross each other on a glass substrate 75 of the lower substrate and a TFT is formed at the crossing part. The gate electrode of the TFT is electrically connected to the gate line 71, and the source electrode of the TFT is electrically connected to the data line 72. The drain electrode of the TFT is electrically connected to the pixel electrodes 73A and 73B through a contact hole.

A gate metal pattern including the gate line 71 and the gate electrode of the TFT is formed on the glass substrate 75 using a gate metal deposition process, a photolithography process and an etching process.

The gate line 71 includes a concave pattern 80 formed in the gate line to provide a separation of the gate line 71 from the link pattern 74 by a designated distance so that the gate line 71 does not overlap the link pattern 74. In other words, the concave pattern 80 partially encompasses the link pattern 74.

A source/drain metal pattern including a data line 72, source and drain electrodes of the TFT and the link pattern 74, is formed on a gate insulating film 76 by a source/drain metal deposition process, a photolithography process and an etching process.

The link pattern 74 is an island pattern not connected to the gate line 71, the data line 72 and the pixel electrodes 73A and 73B prior to performing the repair process. The ends of the link pattern 74 each overlap a respective one of the pixel electrodes 73A and 73B which are adjacent to each other. The link pattern 74 is connectable to the pixel electrodes 73A and 73B by using a laser welding process.

The gate insulating film 76 electrically insulates the gate metal pattern from the source/drain metal pattern, and a passivation film 77 electrically insulates the source/drain metal pattern from the pixel electrodes 73A and 73B.

The pixel electrodes 73A and 73B are formed on the passivation film 77 by a process of depositing a transparent conductive metal, and performing a photolithography process and an etching process. The pixel electrodes 73A and 73B include a protrusion 76 extending from a side of the pixel and overlapping with an end of the link pattern. In operation, a data voltage is supplied to the pixel electrodes 73A and 73B from the data line 72 through the TFT for a scanning period while the TFT is turned on.

The repair process may be performed on the lower substrate before the substrate bonding and liquid crystal injecting process are performed, or may be performed on a display panel after performing the substrate bonding and liquid crystal injecting process. The repair process includes opening a current path either between the source electrode of the TFT and the data line 72 or between the drain electrode of the TFT and the pixel electrode 73A using a laser cutting process in order to interrupt the current path to the pixel electrode 73A through the TFT of the defective pixel. The repair process further includes directing laser emission to the pixel electrodes 73A and 73B which are each adjacent to respective ends of the link pattern 74, as shown in FIG. 8 to connecting the pixel electrodes 73A and 73B to respective ends of the link pattern 74 by laser welding. Portions of the pixel electrodes 73A and 73B and the passivation film 77 are melted by the laser light, and as a result, the pixel electrodes 73A and 73B are connected to the link pattern 74. The current path opening process may be performed prior to or after performing the laser welding process. FIG. 12 shows the electrical separation of the pixel electrodes 73A and 73B from the link pattern 74 by the passivation film 77 prior to the laser welding process.

Figure 13:
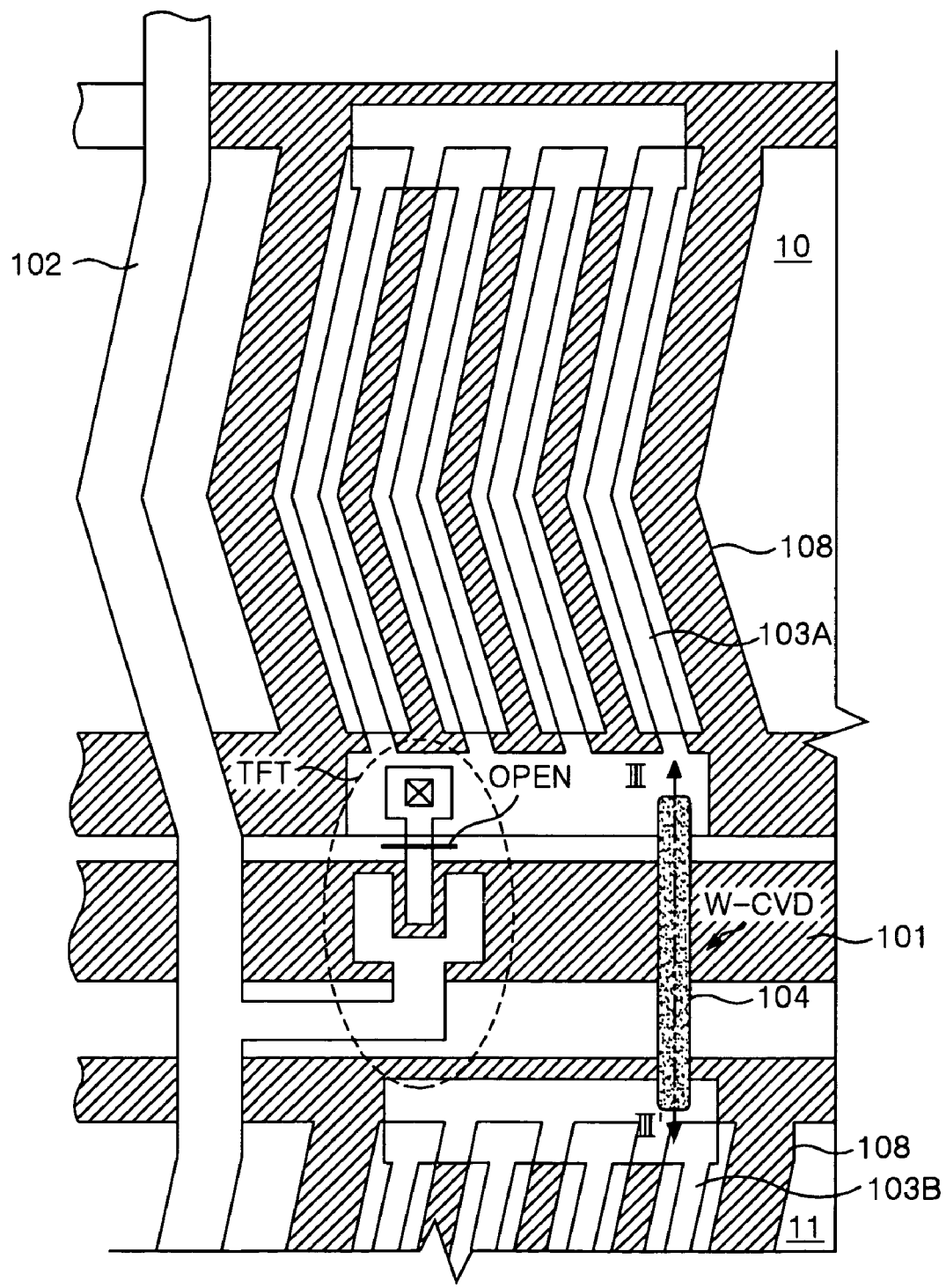
FIG. 13 is a plan view showing a defective pixel and an adjacent normal pixel of the same color for explaining a repair process according to a third embodiment of the present invention.
Figure 14:
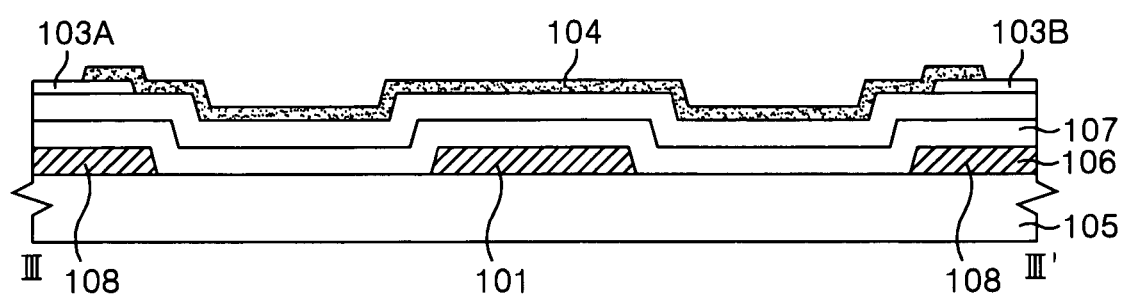
FIG. 14 is a cross sectional diagram showing the defective pixel and the adjacent normal pixel of the same color after the repair process, viewed along the line III-III' of FIG. 13.

FIGS. 13 and 14 illustrate a repair process for an IPS mode liquid crystal display device of according to a third embodiment of the present invention.

Referring to FIGS. 13 and 14, the repair process according to a third embodiment of the present invention includes forming a link pattern 104 on a pixel electrode 103A of the defective sub-pixel 10 and a pixel electrode 103B of the normal sub-pixel 11 which are adjacent to each other by use of a W-CVD (chemical vapor deposition) process.

A gate line 101 and a data line 102 cross each other on a glass substrate 105 of the lower substrate and a TFT is formed at the crossing part. A gate electrode of the TFT is electrically connected to the gate line 101, and a source electrode is electrically connected to the data line 102. The drain electrode of the TFT is electrically connected to the pixel electrodes 103A and 103B through a contact hole.

A gate metal pattern including the gate line 101 and a gate electrode of the TFT, a common electrode 108 is formed on the glass substrate 105 suing a gate metal deposition process, a photolithography process and an etching process. The common electrode 108 is connected to each of the liquid crystal cells to supply a common voltage Vcom to the liquid crystal cells. A horizontal electric field is applied to the liquid crystal cells by applying a common voltage Vcom to the common electrode 108 and applying a data voltage to the pixel electrodes 103A and 103B.

A source/drain metal pattern inclusive of a data line 102, and the source and drain electrodes of the TFT is formed on a gate insulating film 106 by a source/drain metal deposition process, the photolithography process and the etching process.

The pixel electrodes 103A and 103B are formed on the passivation film 107 by a process of depositing a transparent conductive metal, and by performing a photolithography process and an etching process. In operation, a data voltage is supplied to the pixel electrodes 103A and 103B from the data line 102 through the TFT for a scanning period while the TFT is turned on.

The repair process according to the third embodiment of the invention may be performed on the lower substrate prior to performing the substrate bonding and liquid crystal injecting process. The repair process includes opening a current path either between the source electrode of the TFT and the data line 102 or between the drain electrode of the TFT and the pixel electrode 103A by a laser cutting process in order to interrupt the current path between the pixel electrode 103A and the TFT of the defective sub-pixel 10. The repair process further includes directly depositing tungsten (W) onto the pixel electrode 103A of the defective sub-pixel 10 and the pixel electrode 103B of the normal sub-pixel 11 of the same color, which is adjacent thereto, and onto the passivation film 107 between the pixel electrodes 103A and 103B to form the link pattern 104 by a W-CVD process. The current path opening process may be performed either prior to after performing the tungsten deposition process.

Figure 15:
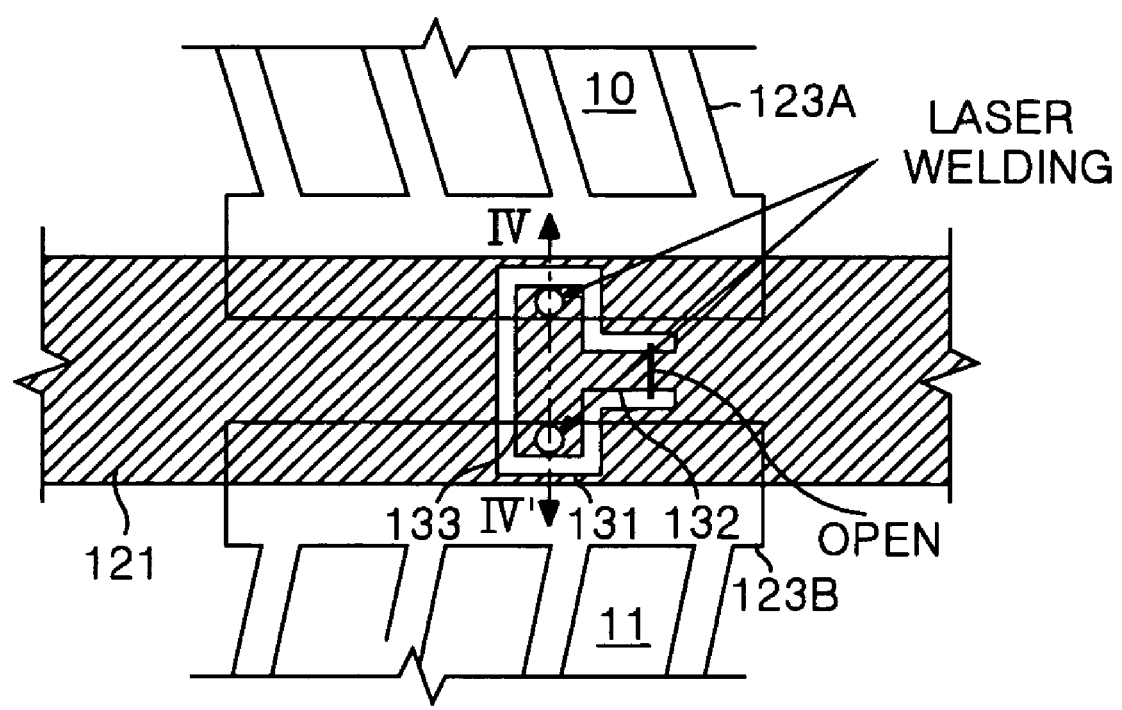
FIG. 15 is a plan view showing a defective pixel and a normal pixel of the same color, which is adjacent thereto, in order to explain a repair process according to a fourth embodiment of the present invention.
Figure 16:
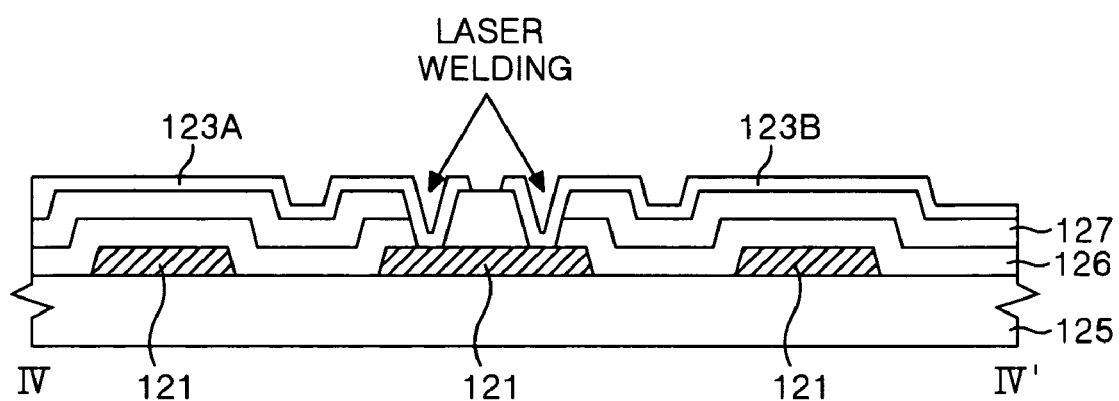
FIG. 16 is a cross sectional diagram showing the defective pixel and the adjacent normal pixel of the same color after the repair process viewed along the line IV-IV' in FIG. 15 after the repair process.

FIGS. 15 and 16 illustrate a repair process for an IPS mode liquid crystal display device according to a fourth embodiment of the present invention. In FIGS. 15 and 16, a common electrode for applying a horizontal electric field to the liquid crystal cells together with the data metal pattern such as the data line, the TFT and the pixel electrode are omitted.

Referring to FIGS. 15 and 16, the gate line 121 of the liquid crystal display device according to the fourth embodiment of the present invention includes a neck part 132; a head part 133 which is connected to the neck part 132 and of which the area is extended; and an opening 131 in the gate line 121 around the perimeter of the head part 133 and neck part 132 having a 'C' shape.

A gate metal pattern including the gate line 121 and a gate electrode of the TFT, and a common electrode is formed on the glass substrate 125 using a gate metal deposition process, a photolithography process and an etching process.

The pixel electrodes 123A and 123B are formed on the passivation film 127 by a process including depositing a transparent conductive metal, and performing a photolithography process and an etching process.

In the repair process, the neck part 131 of the gate line 121 is opened using the laser cutting process. One side end of the head part 133 overlaps the pixel electrode 123A of the defective sub-pixel 10 with the gate insulating film 126 and the passivation film 127, and the other side end of the head part 133 overlaps the pixel electrode 123B of the normal sub-pixel 11 which is adjacent to the defective sub-pixel 10 with the gate insulating film 126 and the passivation film 127 therebetween.

Figure 17:
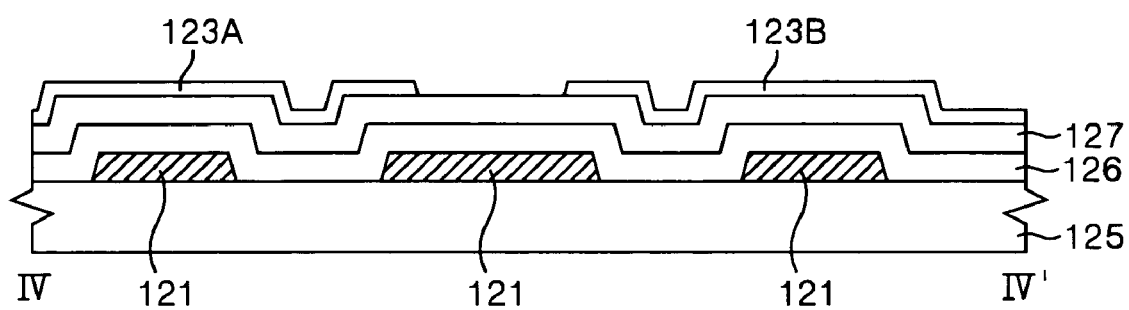
FIG. 17 is a cross sectional diagram showing the defective pixel and the adjacent normal pixel of the same color before the repair process viewed along the line IV-IV' in FIG. 15.

The repair process may be performed on a lower substrate before the substrate bonding and liquid crystal injecting process or on the panel after the substrate bonding and liquid crystal injecting process. The repair process includes opening the current path either between the source electrode of the TFT and the data line or between the drain electrode of the TFT and the pixel electrode 123A using a laser cutting process in order to interrupt the current path between the pixel electrode 123A and the TFT of the defective pixel. The repair process further includes opening the neck part 132 of the gate line 121. Further, the repair process includes irradiating the laser light onto the pixel electrodes 123A and 123B which are adjacent to both ends of the head parts 133, as shown in FIG. 13, by use of the laser welding process. In the laser welding process portions of the pixel electrodes 123A and 123B, the passivation film 127 and the gate insulating film 126 are melted, separating the head part 133 from the gate line 121 and connecting the pixel electrodes 103A and 103B together through the head part 133. The line opening process may be performed prior to or after the laser welding process. FIG. 17 shows the pixel electrodes 123A and 123B and the head part 133 which are electrically separated by the passivation film 127 and the gate insulating film 126 prior to performing the laser welding process.

In the repair process according to a fourth embodiment of the present invention the neck part 133 may be removed during the patterning process for the gate line 121 to form an independent pattern like the link pattern 74 of FIG. 10, making it possible to omit cutting the neck part 133 during the repair process.

A single one of the link patterns 74 of FIG. 10, or the head part 133, the neck part 132 and the aperture pattern 131 of FIG. 15 may be formed for each pixel as described above. Alternatively a plurality of link patterns such as those illustrated in FIG. 10 or FIG. 15 may be used for each pixel to reduce the electrical resistance (i.e., contact resistance) between the linked pixels.

A picture quality controlling method of the liquid crystal display device according to the present invention includes modulating the digital video data to be supplied to the location at which the picture quality defect appears in the display screen using the compensation data thereby compensating for picture quality defects. The compensation data may be computed as in method of fabricating a foregoing liquid crystal display device described above. The method for modulating the data for the digital video data to be supplied to the location at which the picture quality defect appears may vary in accordance with the type of the picture quality defect at the location. For example, for a linked sub-pixel in which the perceptibility of data variation is low because the generation range is narrow in comparison with the panel defect generally appearing in an area, a data modulation method may be applied in which the digital video data to be supplied to the location at which the picture quality defect appears are increased or decreased by the expression unit of the gray level which can be directly expressed by the digital video data. For the panel defect area, the data may be modulated by applying a frame rate control (FRC) and/or a dithering method to allow applying a sub-divided gray level values to achieve finer control of compensation. Frame rate control and dithering are an image control methods which use a visual integration effect. Frame rate control uses visual integration over a temporal arrangement of pixels to represent different hues or gray levels. The temporal arrangement of the pixels spans a plurality of frame periods as a unit of frames. The frame period is also known as a field period and is a display period of one screen when the data are applied to all the pixels of one screen. The frame period is standardized to be 1/60 of a second for an NTSC system and 1/50 of a second for a PAL system. Dithering uses visual integration over a spatial arrangement of pixels to represent different hues or gray levels to make an image expressing a hue or a gray level therebetween.

The picture quality controlling method of the liquid crystal display device according to the present invention is divided into a first compensation step for the panel defect and a second compensation step for the linked sub-pixel.

In a first embodiment for the first compensation step of the picture quality controlling method of the liquid crystal display device according to the present invention, the location information for the panel defect location and the compensation value which corresponds to the panel defect location and is optimized in accordance with the gray level of the input digital video data are stored in a memory, and if the input digital video data are judged to be the data which are to be displayed at the panel defect location by judging the gray level and the display location of the input digital video data, the compensation value is temporally sub-divided over a plurality of frames by use of the frame rate control method. In a second embodiment for the first compensation step of the picture quality controlling method of the liquid crystal display device according to the present invention, the location information for the panel defect location and the compensation value which corresponds to the panel defect location and is optimized in accordance with the gray level of the input digital video data are stored in a memory, and if the input digital video data are judged to be the data which are to be displayed at the panel defect location by judging the gray level and the display location of the input digital video data, the compensation value is spatially sub-divided over a plurality of adjacent pixels by use of the dithering method. In a third embodiment for the first compensation step of the picture quality controlling method of the liquid crystal display device according to the present invention, the location information for the panel defect location and the compensation value which corresponds to the panel defect location and is optimized in accordance with the gray level of the input digital video data are stored in a memory, and if the input digital video data are judged to be the data which are to be displayed at the panel defect location by judging the gray level and the display location of the input digital video data, the compensation value is temporally sub-divided over a plurality of frames by use of the frame rate control method and spatially sub-divided over plurality of adjacent pixels by use of the dithering method.

Figure 18:
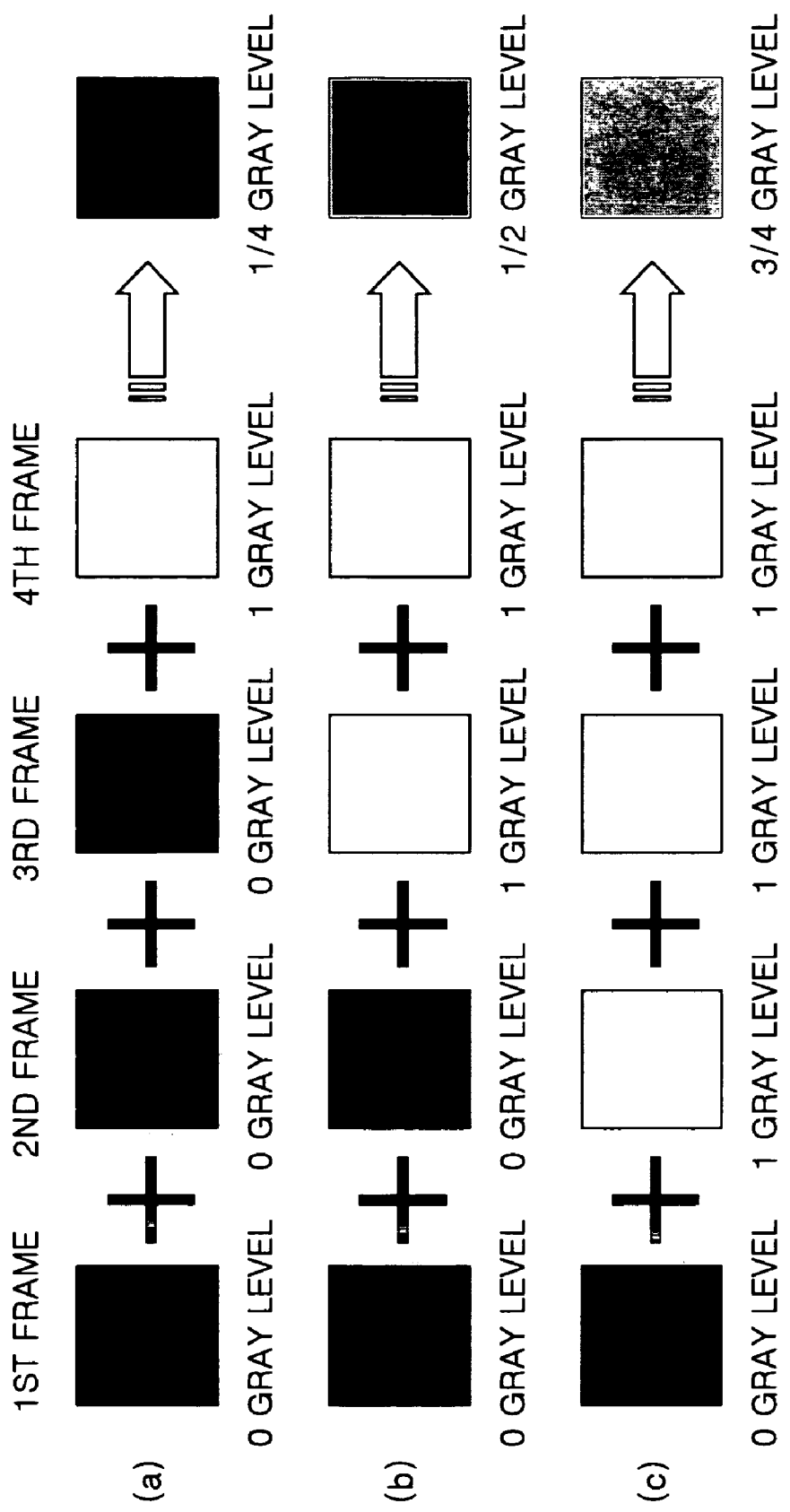
FIG. 18 is a diagram presenting an example of a frame rate control method.

An explanation will be made for the frame rate control method and the dithering method with reference to FIGS. 18 to 20. For example, in case of expressing an intermediate gray level such as ¼ gray level, ½ gray level, ¾ gray level on a screen composed of pixels in which only 0 gray level and 1 gray level can be displayed, in the frame rate control method, if the 0 gray level is displayed in any one pixel for the three frames among the four frames which makes one frame group and are sequential and the 1 gray level is displayed for one frame, as shown in (a) of FIG. 18, then an observer perceives a ¼ gray level for the pixel. In a similar manner, the ½ gray level and the ¾ gray level are also expressed, as shown in (b) and (c) of FIG. 18. In the dithering method, if the 0 gray level is displayed in three pixels among the four pixels which have a 2×2 pixel structure and make one pixel group and the 1 gray level is displayed in one pixel, as shown in (a) of FIG. 19, then an observer perceives a the ¼ gray level for the pixel group. In the same manner, the ½ gray level and the ¾ gray level are also expressed, as shown in (b) and (c) of FIG. 19. In addition, as a method of using the frame rate control method and the dithering method together, FIG. 20 represents that an intermediate gray level is expressed by simultaneously applying the dithering method having a 2×2 pixel structure as a pixel group and the frame rate control method having four frames as a unit for the pixel group. In case of the frame rate control method and dithering method taking the 2×2 pixel structure and the four frames as the unit of frames, if referring to (a) of FIG. 20, the gray level shown by the pixel group at each frame for four frames is the ¼ gray level, and each pixel (first to fourth pixels) which forms the pixel group represents the ¼ gray level by having the four frames as a unit. In the same manner, when expressing the ½ gray level, as shown in (b), each pixel group expresses the ½ gray level for each frame by the dithering method and each pixel expresses the ½ gray level over four frames. In the same manner, the ¾ gray level is expressed as shown in (c). The controlling method of applying the frame rate control and the dithering together in this way has an advantage that it is possible to solve a flicker which can be generated in the frame rate control method and a resolution deterioration which can be generated in the dithering method.

Figure 21:
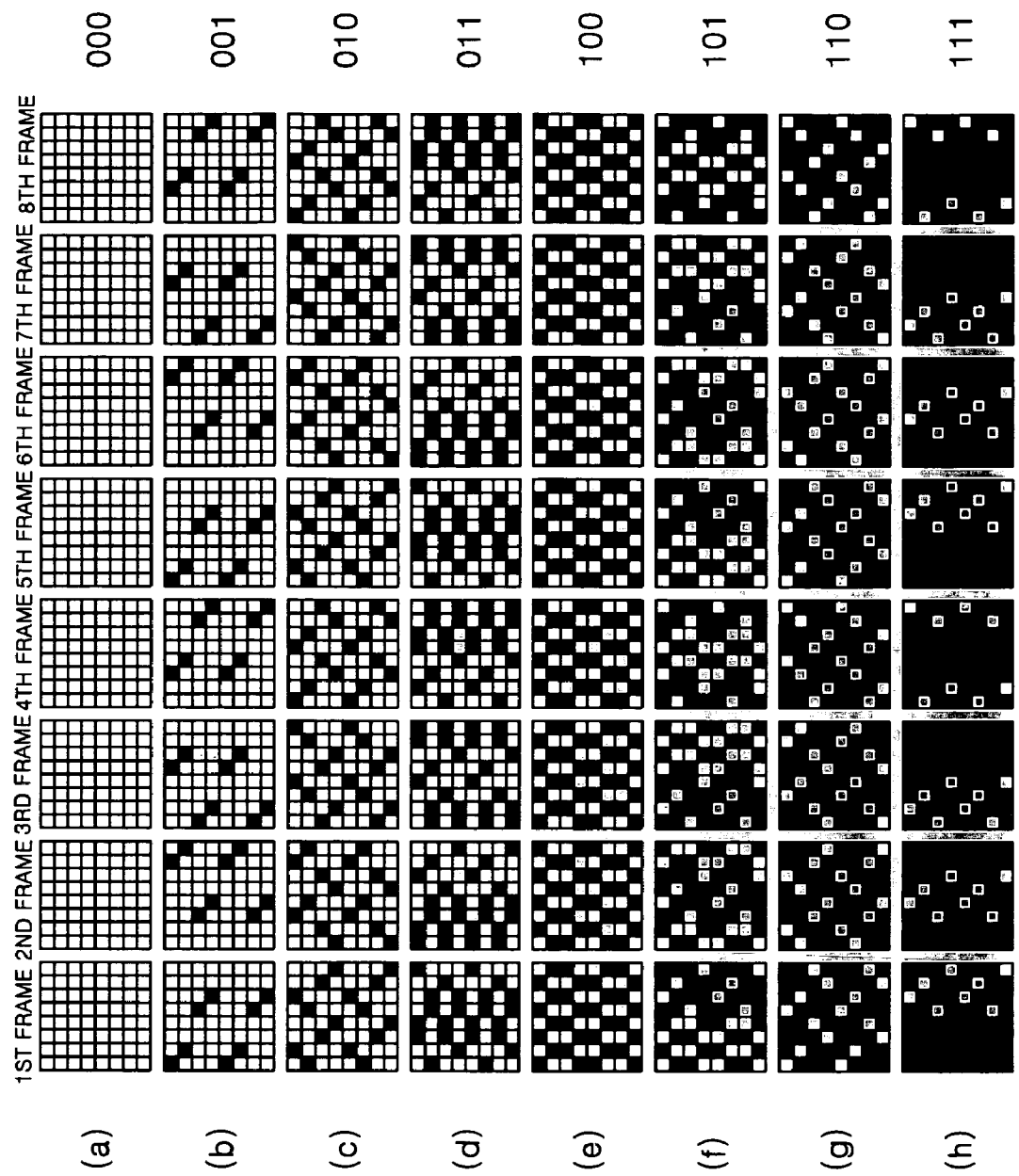
FIG. 21 is a diagram presenting another example of a mixed method of the frame rate control method and the dithering method.

The number of frames which form the unit of frames in the frame rate control method or the number of pixels which form the pixel group in the dithering method may be variously adjusted as occasion demands. As an example, FIG. 21 illustrates a controlling method which uses the frame rate control and dithering using an 8×8 pixel structure and eight frames as a unit.

Figure 22A:
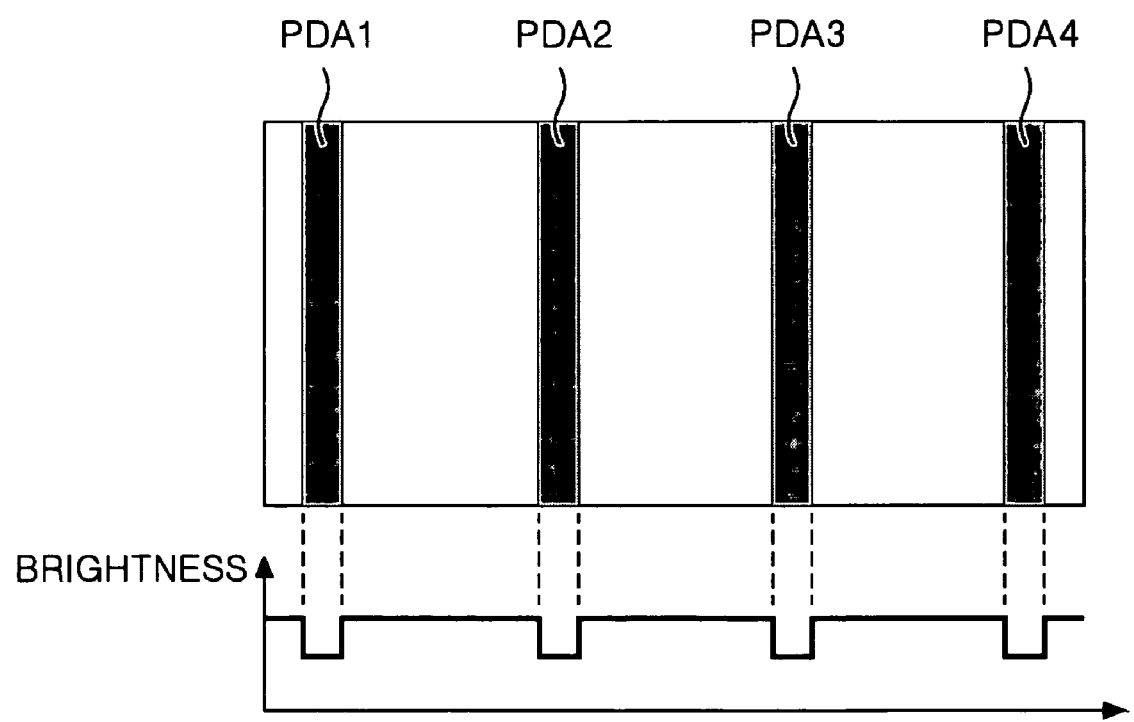
FIG. 22A is a diagram presenting an example of a panel defect for explaining panel defect compensation data.

For example, if there are panel defect areas 1 to 4 (PDA1 to PDA4) on the display panel as shown in FIG. 22A, in order to compensate the panel defect areas 1 to 4 (PDA1 to PDA4) by the frame rate control and dithering method as in FIG. 21, the panel defect compensation data for each gray level, for each location of each panel defect area (PDA1 to PDA4) can be stored at EEPROM, as shown in the following TABLE 1.

TABLE 1

| Classification | Gray level values | PDA1 | PDA2 | PDA3 | PDA4 |
| --- | --- | --- | --- | --- | --- |
| Gray Level Range 1 | 00000000(0)~00110010(50) | 010(2) | 010(2) | 010(2) | 100(4) |
| Gray Level Range 2 | 00110011(51)~00111000(112) | 011(3) | 011(3) | 010(2) | 101(5) |
| Gray Level Range 3 | 01110001(113)~10111110(190) | 100(4) | 100(4) | 011(3) | 110(6) |
| Gray Level Range 4 | 10111111(191)~11111010(250) | 101(5) | 101(5) | 011(3) | 111(7) |

When the panel defect compensation data stored at the EEPROM is as in TABLE 1, the first compensation step performs the frame rate control and dithering as shown in (d) of FIG. 21 by using the compensation data of '011' (3) if the digital video data which are to be supplied to the 'panel defect area 1 (PDA1)' are '01000000' (64) corresponding to the 'gray level range 2' to thus modulate the digital video data to be supplied to 'panel defect area 1' (PDA1). The frame rate control and dithering are performed in a pattern shown in (g) of FIG. 21 by using the compensation data of '110' (6) if the digital video data which are to be supplied to the 'panel defect area 4 (PDA4)' are '10000000' (128) corresponding to the 'gray level range 3' to thus modulate the digital video data to be supplied to the 'panel defect area 4 (PDA4)'.

As described above, the first compensation step of the picture quality controlling method of the liquid crystal display device according to the present invention may compensate the brightness difference of the panel defect location using the picture quality controlling method employing frame rate control and/or dithering to express the hue and gray level by subdividing the hue or gray level which the screen of the display device can express in accordance with a data processing capacity of the display device, allowing more natural and higher quality images to be realized.

In the second compensation step of the picture quality controlling method of the liquid crystal display device according to the embodiment of the present invention the digital video data which are to be displayed in the linked sub-pixel is increased or decreased by the gray level expression unit which can be expressed by the digital video data.

Figure 22B:
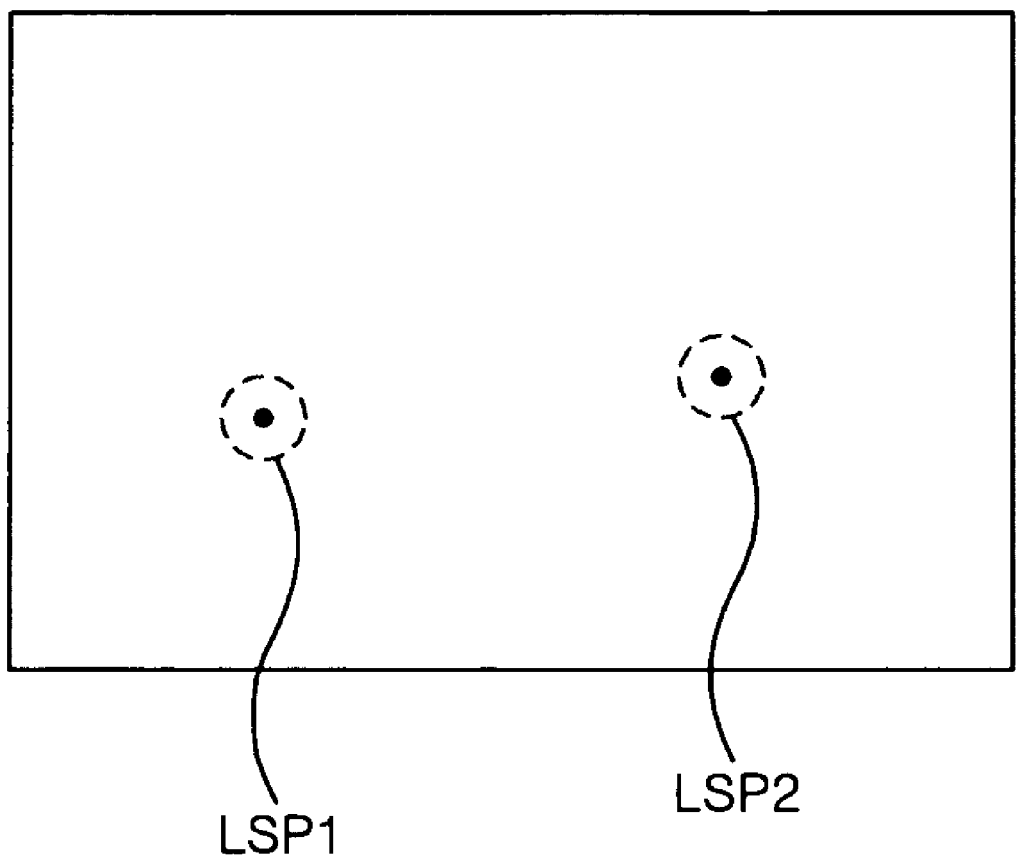
FIG. 22B is a diagram presenting an example of a link pixel for explaining charge characteristic compensation data.

For example, as shown in FIG. 22B, when the linked sub-pixels 1 and 2 (LSP1 and LSP2) exist on the display panel, the panel defect compensation data for each location of the each linked sub-pixel LSP1 and LSP2 and for each gray level can be stored at the EEPROM, as shown in TABLE 2, in order to compensate for the charge characteristic of the linked sub-pixel 1 and 2 LSP1, LSP2.

TABLE 2

| Classification | Gray Level Area | Linked Sub-Pixel 1 | Linked Sub-Pixel 2 |
| --- | --- | --- | --- |
| Gray Level Range 1 | 00000000(0)~00110010(50) | 00000100(4) | 00000010(2) |
| Gray Level Range 2 | 00110011(51)~00111000(112) | 00000110(6) | 00000100(4) |
| Gray Level Range 3 | 01110001(113)~10111110(192) | 00001000(8) | 00000110(6) |

When the panel defect compensation data stored at the EEPROM are as in TABLE 2, the second compensation step modulates the digital video data to be supplied to the linked sub-pixel 1 (LSP1) to '01000100' (68) by adding '00000100' (4) to '01000001' (64) if the digital video data which are supplied to the linked sub-pixel 1 LSP1 is '01000001' (64) corresponding to the 'gray level range 1', and modulates the digital video data which are to be supplied to the linked sub-pixel 2 to '10000110' (134) by adding '00000110' (6) to '10000001' (128) if the digital video data which are supplied to the linked sub-pixel 2 LSP2 is '10000001' (128) corresponding to the 'gray level range 3'.

As described above, in the second compensation step of the present invention a defective sub-pixel is electrical connected to an adjacent normal sub-pixel of the same color to form a linked sub-pixel, and the digital video data to be displayed in the linked sub-pixel is modulated using the predetermined compensation data to compensate for the charge characteristic of the linked sub-pixel to decrease the perceptibility of the defective sub-pixel.

Figure 22C:
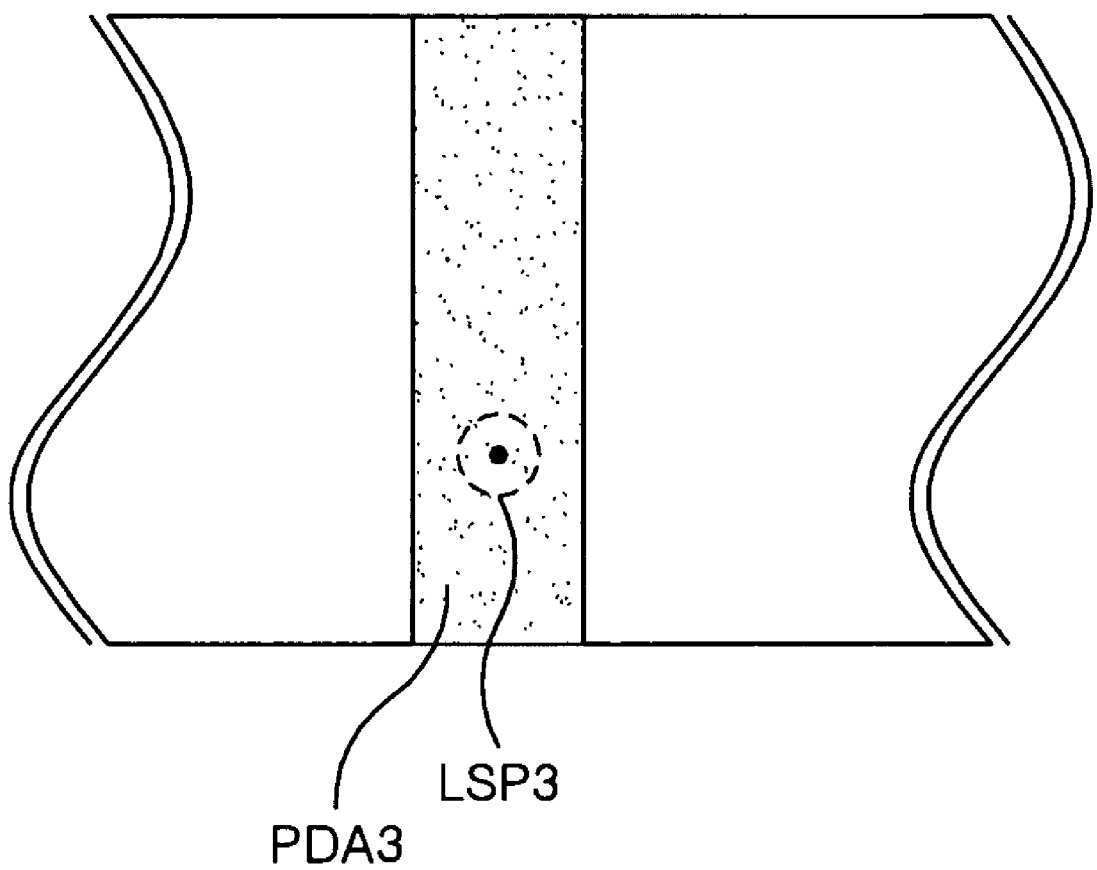
FIG. 22C is a diagram presenting an example that a location of a panel defect is overlapped with a location of a link pixel.

On the other hand, as shown in FIG. 22C, the linked sub-pixel LSP3 can exist within the panel defect area PDA3 on the display panel. When the panel defect area 3 (PDA3) is over-lapped with the linked sub-pixel LSP3, the second compensating part computes the charge characteristic compensation data in consideration of the panel defect compensation data value computed by the first compensating part.

For example, assuming that for a panel defect area separated from the linked sub-pixel, the panel defect compensation data in a specific gray level (area) are determined to be '+2' and the charge characteristic compensation data are determined to be '+6', in the case where the panel defect area PDA3 and the linked sub-pixel LSP3 are overlapped as above, the charge characteristic for the linked sub-pixel LSP3 is compensated by '+2' in the first compensating part and thus the charge characteristic is compensated by '+4' (+6−2) for the linked sub-pixel in the second compensating part.

Figure 23:
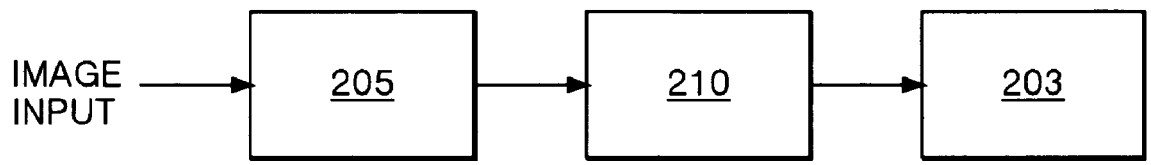
FIG. 23 is a block diagram illustrating a flat panel display device according to an embodiment of the present invention.

In order to realize the picture quality controlling method according to the embodiment of the present invention as described above, a liquid crystal display device according to an embodiment of the present invention, includes a compensation circuit 205 which receives the video data, modulates the received data, and supplies to the driver 210 which drives the display panel 203 as shown in FIG. 23.

Figure 24:
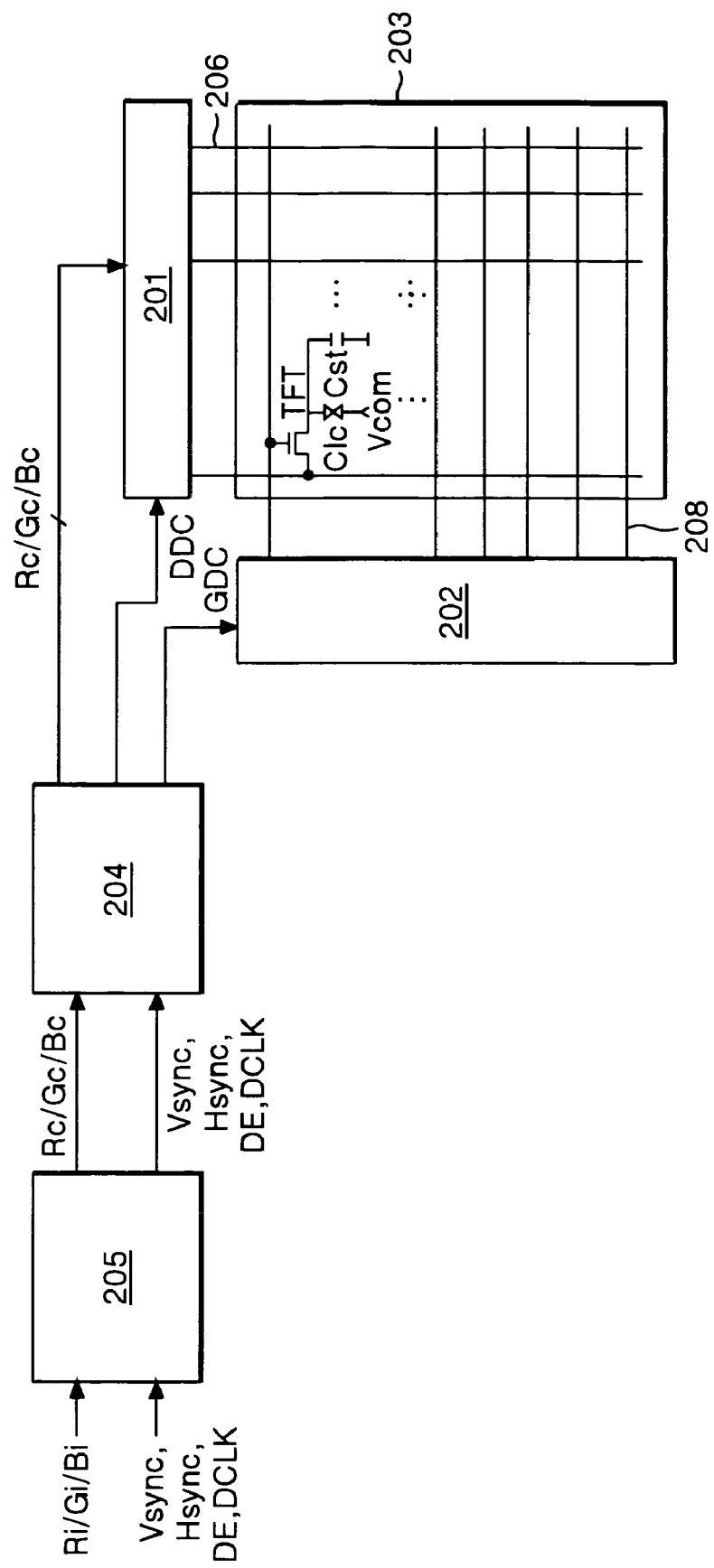
FIG. 24 is a block diagram illustrating a flat panel display device according to an embodiment of the present invention.

FIG. 24 illustrates a liquid crystal display device according to an embodiment of the present invention.

Referring to FIG. 24, the liquid crystal display device according to the embodiment of the present invention includes: a display panel 203 in which data lines 206 cross gate lines 208 and a TFT for driving a liquid crystal cell Clc is formed at each crossing of a date line 206 and a gate line 208; a compensation circuit 205 for generating a corrected digital video data Rc/Gc/Bc; a data drive circuit 201 for converting the corrected digital video data Rc/Gc/Bc into the analog data voltage to supply to the data lines 206; a gate drive circuit 202 for supplying a scan pulse to the gate lines 206; and a timing controller 204 for controlling the data drive circuit 201 and the gate drive circuit 202.

The display panel 203 has a liquid crystal layer disposed between two substrates, i.e., between the TFT substrate and color filter substrate. The crossing data lines 206 and the gate lines 208 are formed on the TFT substrate. Each TFT formed at the crossing of a data line 206 and a gate lines 208 supplies a data voltage supplied to the data line 206 to the pixel electrode of the liquid crystal cell Clc in response to the scan pulse from the gate line 208. A black matrix, a color filter and a common electrode are formed on the color filter substrate. Alternately, the common electrode formed in the color filter substrate can be formed on the TFT substrate for a device employing a horizontal electric field application method. Polarizers having polarizing axes substantially perpendicular to each other are respectively adhered to the TFT substrate and the color filter substrate.

The compensation circuit 205 receives input digital video data Ri/Gi/Bi from a system interface; and modulates the input digital video data Ri/Gi/Bi to be supplied to a panel defect location, thereby generating corrected digital video data Rc/Gc/Bc. A detailed description of the compensation circuit 205 will be provided below.

The timing controller 204 generates a gate control signal GDC for controlling the gate drive circuit 202 and a data control signal DDC for controlling the data drive circuit 201 by use of a vertical/horizontal synchronization signal Vsync/Hsync, a data enable signal DE and a dot clock DCLK supplied through the compensation circuit 205. The timing controller 204 supplies the corrected digital video data Rc/Gc/Bc to the data drive circuit 201 in response to the dot clock DCLK.

The data drive circuit 201 receives the corrected digital video data Rc/Gc/Bc, converts the digital video data Rc/Gc/Bc into the analog gamma compensation voltages, and supplies the analog gamma compensation voltages as the data voltages to the data lines 206 of the liquid crystal display panel 203 under control of the timing controller 204.

The gate drive circuit 202 sequentially supplies a scan signal to the gate lines 208, thereby turning on the TFTs connected to the gate lines 208 to select the liquid crystal cells Clc of one horizontal line to which the analog gamma compensation voltage is to be supplied. The analog data voltages output by the data drive circuit 201 are synchronized with the scan pulse to be supplied to the liquid crystal cells Clc of the selected one horizontal line.

Figure 25:
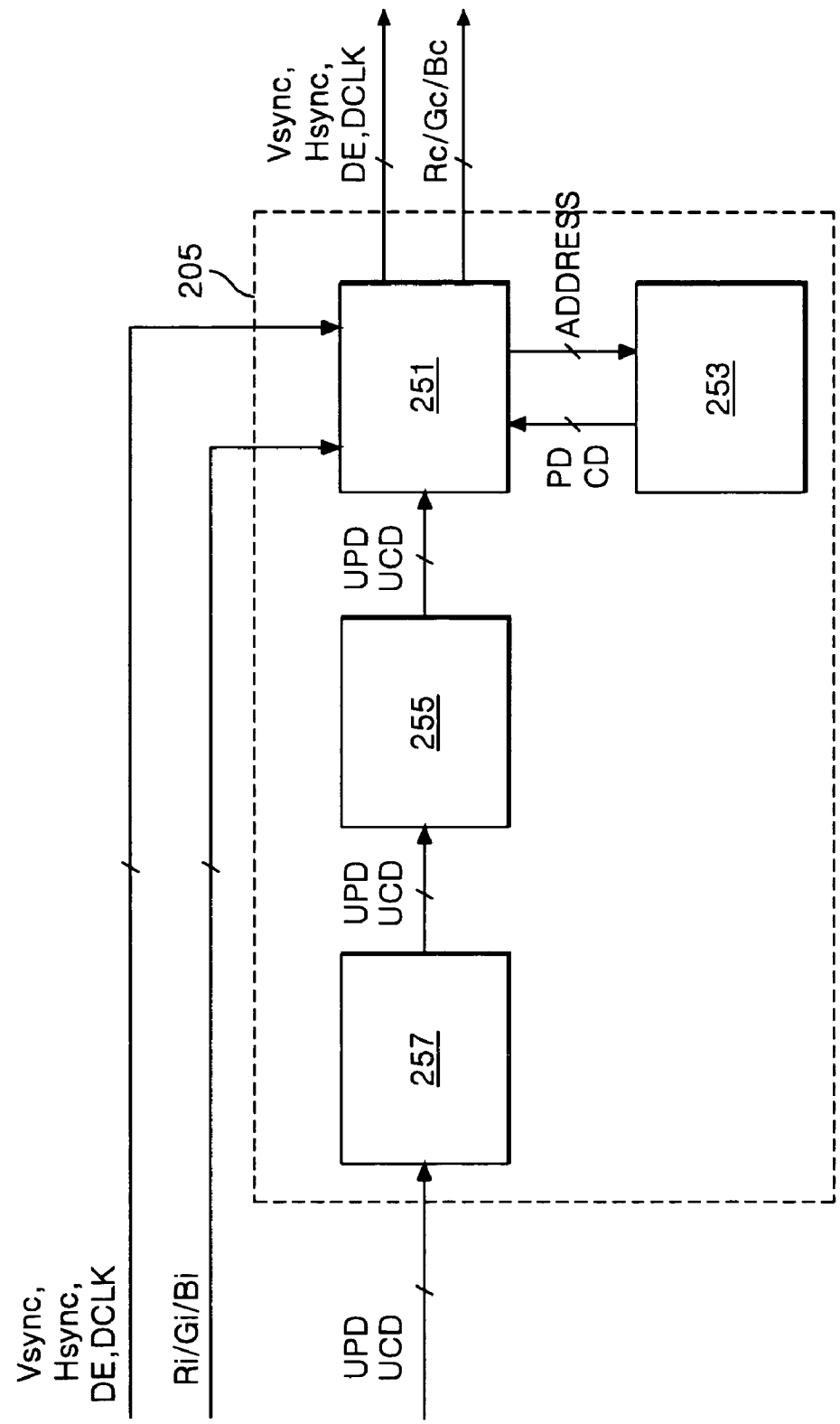
FIG. 25 is a block diagram illustrating a compensation circuit shown in FIG. 24.
Figure 31:
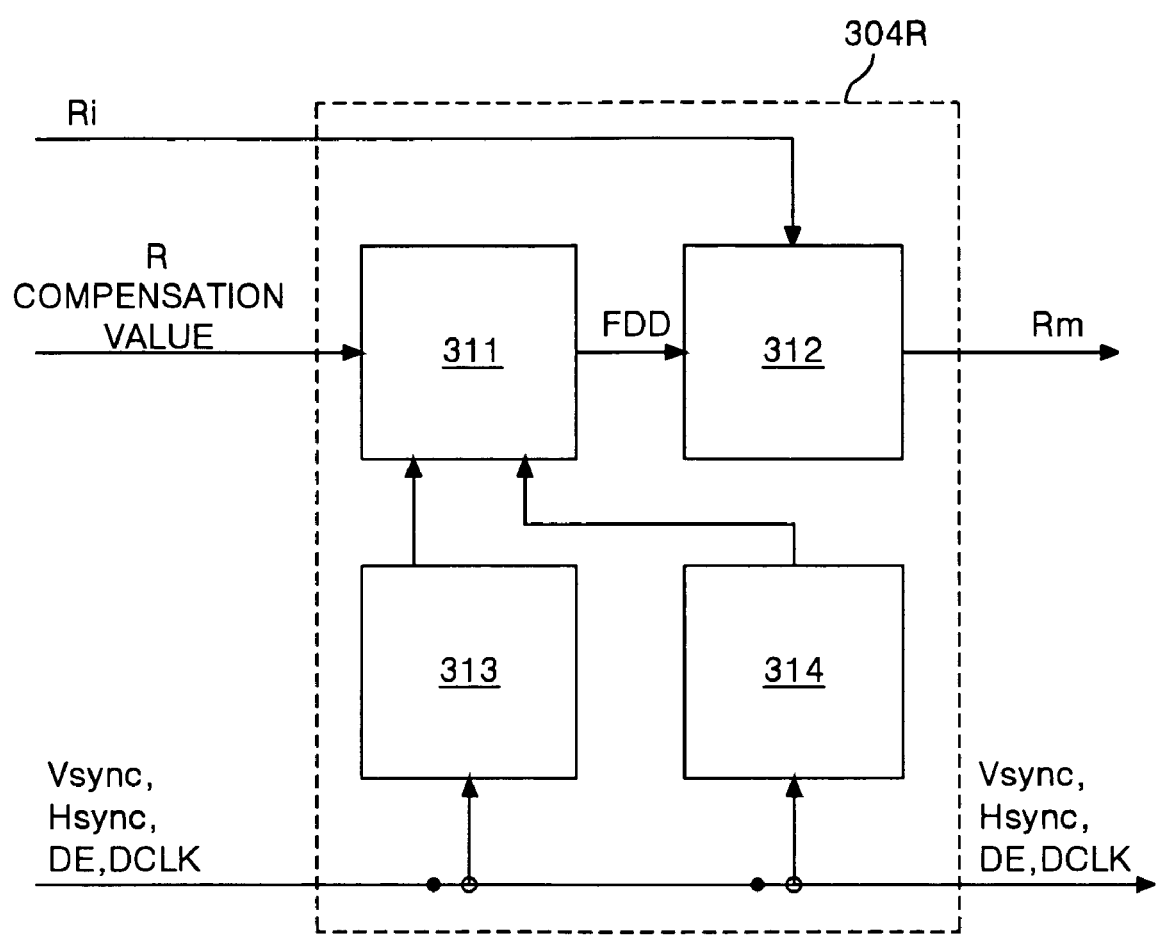
FIG. 31 is a block diagram illustrating a frame rate control and dithering controller.

A detailed description of the compensating part 205 will be provided with reference to FIGS. 25 and 31.

Referring to FIG. 25, the compensating part 205 includes: an EEPROM 253 storing a location data PD describing the location of the linked sub-pixel and the panel defect area of the display panel 203, a panel defect compensation data CD for compensating the brightness to be displayed in the panel defect area, and a charge characteristic compensation data CD for compensating the charge characteristic of the linked sub-pixel; a compensating part 251 for generating the corrected digital video data Rc, Gc, Bc by modulating the input video digital data Ri/Gi/Bi by use of the location data and the compensation data stored in the EEPROM 253; an interface circuit 257 for communicating between the compensation circuit 205 and an external system; and a register 255 for temporarily storing the data provided through the interface circuit 257 for storage in the EEPROM 353.

The compensation values for the compensation data stored at the EEPROM 253 may vary in accordance with the gray level of the input digital video data Ri/Gi/Bi. The compensation data may also vary or be associated with a gray level range inclusive of a plurality of gray levels. In case of establishing the compensation value in correspondence with a gray level range, information for the gray level range, i.e., information for the gray levels included in the gray level range, is also stored at the EEPROM 253. The location data PD and the compensation data CD stored at the EEPROM 253 can be renewed or rewritten using a ROM writer.

The interface circuit 257 is configured to support communication between the compensation circuit 205 and the external system, and the interface circuit 257 and may be designed according to a communication standard protocol such as I²C. The external system can read or modify the data stored at the EEPROM 253 through the interface circuit 257. That is to say, the compensation data CD and the location data PD stored at the EEPROM 253 are may be updated to accommodate variations such as changes in manufacturing process, differences between model, and specific applications. A user may supply location data UPD and the compensation data UCD to be uploaded from the external system for modifying the data stored at the EEPROM 253.

The location data UPD and the compensation data UCD transmitted through the interface circuit 257 are temporarily stored at the register 255 prior to updating the location data PD and the compensation data CD stored at the EEPROM 253.

Hereinafter, a detailed description will be made for the compensating part 251 according to the present invention with reference to FIGS. 26 to 31.

Figure 26:
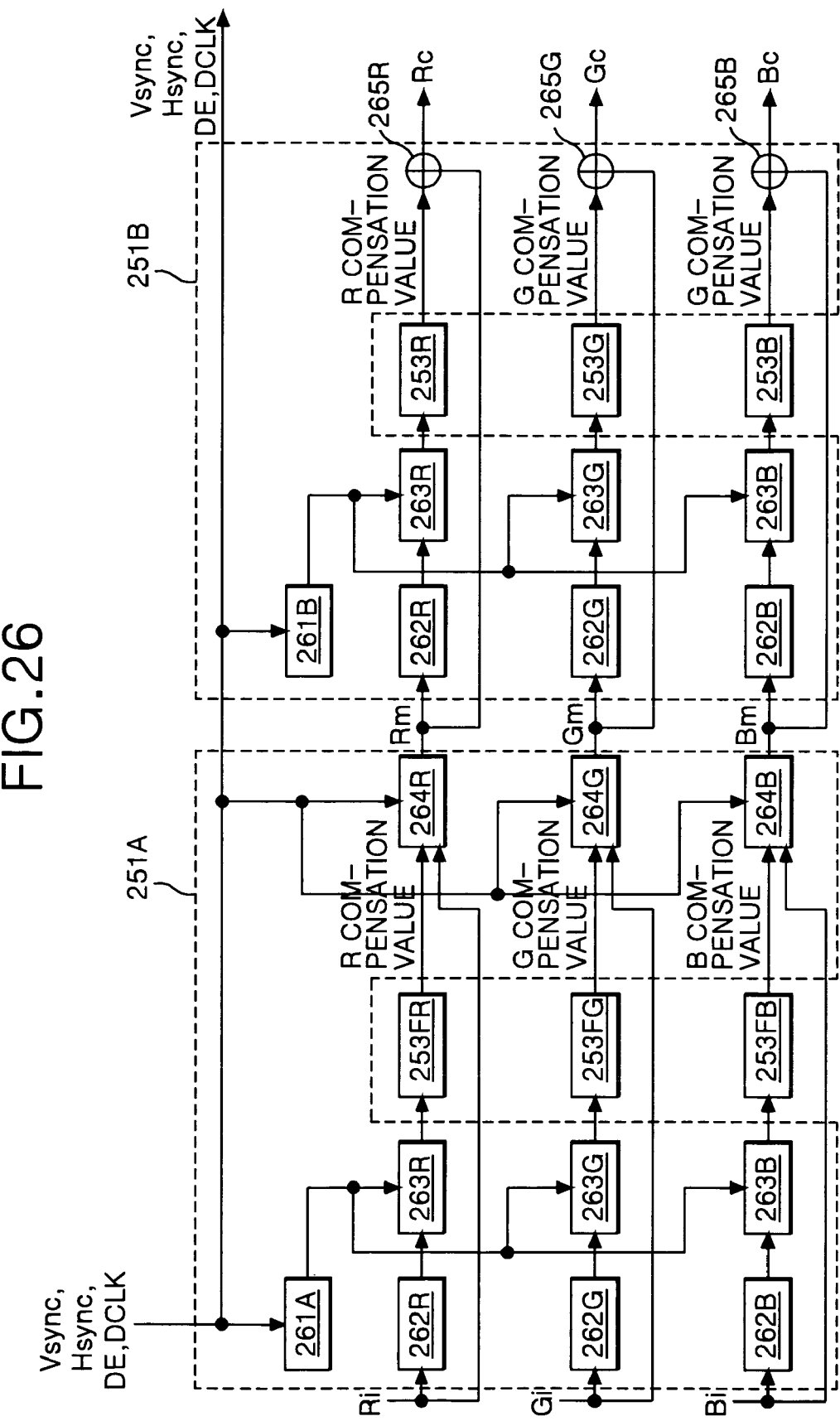
FIG. 26 is a block diagram illustrating a first embodiment for a compensating part shown in FIG. 25.

Referring to FIG. 26, the compensating part 251 according to the first embodiment of the present invention includes a first compensating part 251A which modulates the input digital video data Ri/Gi/Bi that are to be supplied to the panel defect location by the FRC method by use of the panel defect location data PD and the panel defect compensation data CD stored at the EEPROM 253; and a second compensating part 251B which modulates the digital video data Rm/Gm/Bm modulated by the first compensating part 251A, by use of the charge characteristic compensation data.

The first compensating part 251A includes a location judging part 261A, a gray level judging part 262, an address generating part 263, and an FRC controller 264.

On the other hand, the EEPROM 253 read by the first compensating part 251A includes EEPROM's 253FR, 253FG, 253FB respectively for each of red R, green B, and blue B in which the panel defect location data PD and the panel defect compensation data CD are stored.

The location judging part 261A judges the location on the display panel 203 at which the input digital video data Ri/Gi/Bi are to be displayed by use of a vertical/horizontal synchronization signal Vsync/Hsync, a data enable signal DE, and a dot clock DCLK.

The gray level judging part 262 includes a gray level judging part 262R, 262G, 262B for each of red R, green G and blue B. The gray level judging part 262R, 262G, 262B analyzes the gray level of the input digital video data Ri/Gi/Bi.

The address generating part 263 includes an address generating part 263R, 263G, 263B for each of red R, green G, and blue B. The address generating part 263R, 263G, and 263B retrieves the panel defect location data from the EEPROM 253FR, 253FG, and 253FB and the judging result of the location judging part 261, and if the display location of the input digital video data Ri/Gi/Bi corresponds to a panel defect location, the address generating part 263R, 263G, and 263B generates a read address for reading the panel defect compensation data of the panel defect area from the EEPROM 253FR, 253FG, and 253FB. The panel defect compensation data are read from the using the read addressed EEPROM 253FR, 253FG, and 253FB are supplied to the FRC controller 264R, 264G, and 264B.

The FRC controller 264 includes a FRC controller 264R, 264G, and 264B for each of red R, green G, and blue B. The FRC controller 264R, 264G, and 264B increases or decreases the input digital video data Ri/Gi/Bi using the panel defect compensation data from the EEPROM 253FR, 253FG, and 253FB, to modify the data which are to be displayed at the panel defect area. But, the number of frames and the frame order with which the panel defect compensation data are increased or decreased, as shown in FIG. 18, may be made varied in accordance with the panel defect compensation value to thereby subdivide the panel defect compensation data over a plurality of frames. For example, when the frame unit (number of frames) for controlling the FRC is made to be four frames, as in FIG. 18 and '00' is a panel defect compensation data for compensating 0 gray level, '01' is for ¼ gray level, '10' is for ½ gray level, '11' is for ¾ gray level, if the panel defect compensation data set as the compensation value which is to be compensated at the panel defect location is '01' for compensating 0.5 (½) gray level, the FRC controller 264R, 264G, 264B adds '1' gray level to the data of the corresponding panel defect location pixel for two frame period among the four frame periods so as to provide a compensation of 0.5 gray level to the Ri/Gi/Bi data be displayed at the panel defect location. Each of the FRC controllers 264R, 264G, 264B may be configured as shown in FIG. 27.

Figure 27:
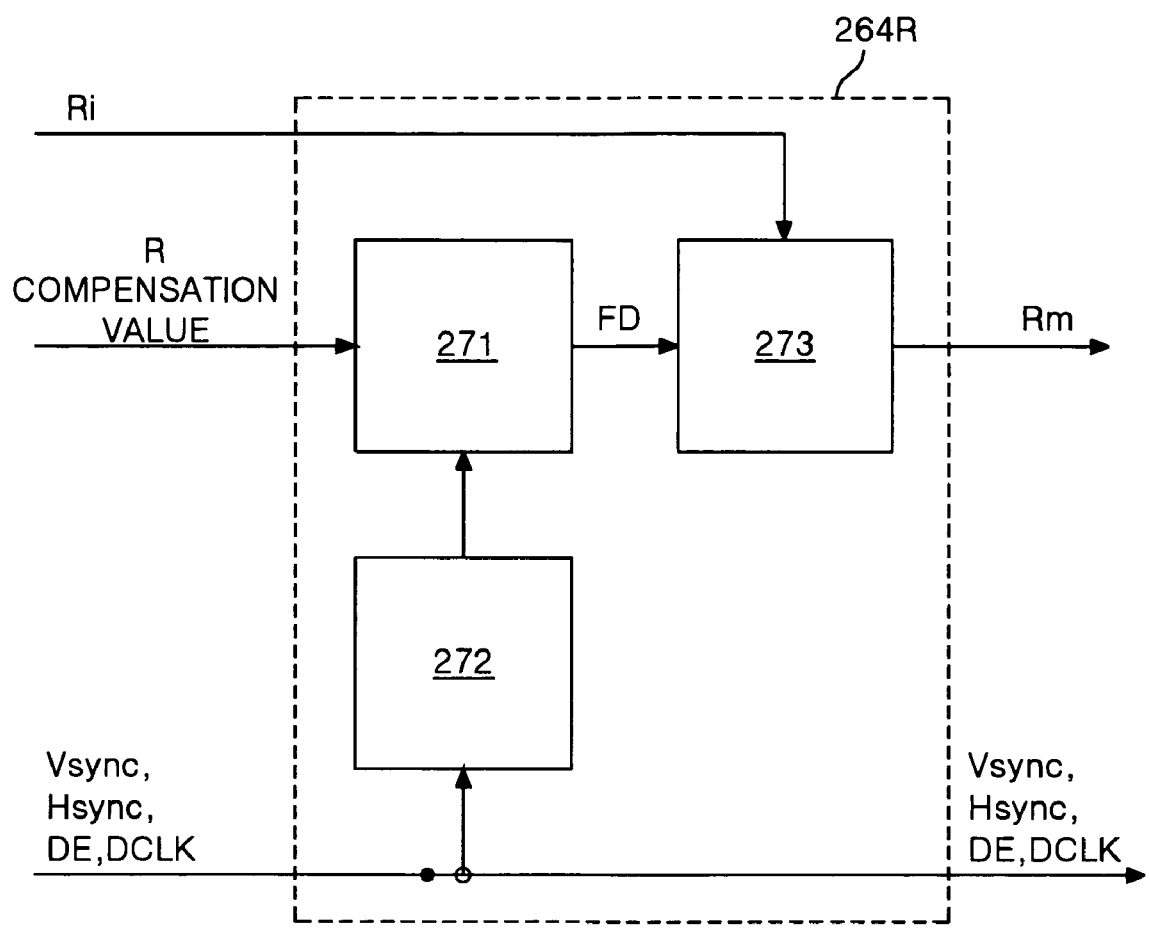
FIG. 27 is a block diagram illustrating a frame rate control controller shown in FIG. 26.

FIG. 27 shows details of a first FRC controller 264R for red data. The second and third FRC controllers 264G and 264B for green and blue data have substantially the same circuit configuration as the first FRC controller 264R.

Referring to FIG. 27, the first FRC controller 264R includes a compensation value judging part 271, the frame number sensing part 272 and an operator 273.

The compensation value judging part 271 accepts the R compensation value and generates FRD data FD using a value calculated by dividing the compensation value by the number of frames in a frame unit. For example, when using four frames as the frame unit, if the R panel defect compensation data '00' are to be interpreted as the compensation value for 0 gray level, the R panel defect compensation data '01' are to be interpreted as ¼ gray level, the R panel defect compensation data '10' are to be interpreted as ½ gray level and the R panel defect compensation data '11' are to be interpreted as ¾ gray level, the compensation value judging part 271 judges the R panel interprets compensation data '01' instruction to add ¼ gray level to the display gray level of the data of the corresponding panel defect location. To implement the addition of ¼ gray level, the compensation value judging part 271 generates the FRC data FD of '1' in the frame period when one gray level is to be added in one frame among the first to fourth frames and generates the FRC data FD of '0' for the remaining 3 frame periods, as shown in (a) of FIG. 18.

The frame number sensing part 272 senses the number of the frame by use of one or more of the vertical/horizontal synchronization signal Vsync/Hsync, the dot clock DCLK and the data enable signal DE. For example, the frame number sensing part 272 may sense the number of the frame by counting the vertical synchronization signal Vsync.

The operator 273 generates the corrected digital video data Rm by increasing or decreasing the input digital video data Ri/Gi/Bi to the FRC data FD.

The input digital video data Ri/Gi/Bi to be corrected and the panel defect compensation data CD may be supplied through separate data transmission circuits to the FRC controller 264R, 264G, and 264B, or the input digital video data Ri/Gi/Bi to be corrected and the panel defect compensation data CD may be combined to be supplied through the same circuit. For example, in case that the input digital video data Ri/Gi/Bi to be corrected are '01000000' being 8 bits and the panel defect compensation data CD is '011' being 3 bits, it is possible that the '01000000' and '011' are each supplied to the FRC controller 264R, 264G, 264B through the different data transmission circuit or are combined to be '01000000011' of 11 bits to be supplied to the FRC controller 264R, 264G, and 264B. When the input digital video data Ri/Gi/Bi to be corrected and the panel defect compensation data CD are combined into 11 bits of data to be supplied to the FRC controller 264, the FRC controller 264 recognizes the upper 8 bits of the 11 bit data as the input digital video data Ri/Gi/Bi to be corrected and recognizes the lower 3 bits as the panel defect compensation data CD for performing the FRC. As one example of a method of generating the data of '01000000011' from '01000000' and '011', dummy bits of '000' may be appended as lower bits to convert '01000000' to convert into '01000000000', and the data of '01000000011' may be generated by adding '011' thereto.

As described above, the first compensation part 251A according to the first embodiment of the present invention can sub-divide a compensation value into 1021 gray levels to be able to correct the data which are to be displayed at the panel defect location when, for example, the input R, G, B digital video data are each 8 bits and the compensation value is divided temporally by having four frame periods as one frame group.

The second compensating part 251B generates the corrected digital video data Rc/Gc/Bc by increasing or decreasing the data of the linked sub-pixel 13 included in the digital video data Rm/Gm/Bm modified by the first compensating part 251A or the data of the linked sub-pixel 13 included in the data of the non defect area which are not modulated by the first compensating part 251A. The second compensating part 251B includes a location judging part 261B, a gray level judging part 262, an address generating part 263, and an operator 265. The EEPROM 253 accessed by the second compensating part 251B includes EEPROM's 253R, 253G, and 253B in which the charge compensation data CD and the location data PD of the linked sub-pixel 13 are stored respectively for each of red R, green B, and blue B.

The location judging part 261B judges the display location of the input digital video data Ri/Gi/Bi by use of a vertical/horizontal synchronization signal Vsync, Hsync, a data enable signal DE, and a dot clock DCLK.

The gray level judging part 262 includes a gray level judging part 262R, 262G, and 262B for each of red R, green G and blue B. The gray level judging part 262R, 262G, and 262B analyzes the gray level of the input digital video data Ri/Gi/Bi.

The address generating part 263 includes an address generating part 263R, 263G, and 263B for each of red R, green G, and blue B. The address generating part 263R, 263G, and 263B accesses the location data of the linked sub-pixel 13 stored at the EEPROM 253R, 253G, and 253B and the judging result of the location judging part 261B, and if the display location of the input digital video data Ri/Gi/Bi corresponds to the location of the linked sub-pixel 13, the address generating part 263R, 263G, and 263B generates a read address for reading the charge characteristic compensation data in the linked sub-pixel 13 to supply to the EEPROM 253R, 253G, and 253B. The charge characteristic compensation data retrieved from the EEPROM 253R, 253G, and 253B using the read address are supplied to the operator 265R, 265G, and 265B.

The operator 265 includes an operator 265R, 265G, and 265B for each of red R, green G, and blue B. The operator 265R, 265G, and 265B may modulates the input digital video data Ri/Gi/Bi which are to be displayed at the normal sub-pixel 11 included in the linked sub-pixel 13 by adding or subtracting the charge characteristic compensation data to or from the input digital video data Ri/Gi/Bi using an adder or subtractor. The operator 265R, 265G, and 265B may include a multiplier or divider for performing multiplication and division on the input digital video data by the charge characteristic compensation data as an alternative to the adder and subtractor.

The digital video data Rc, Gc, Bc that has been modulated by the foregoing first and second compensating parts 251A and 251B and for which the panel defect and/or charge characteristic have compensated, are supplied to the display panel 203 as corrected digital video data through the drive circuit 210 to display a picture having corrected picture quality.

Figure 28:
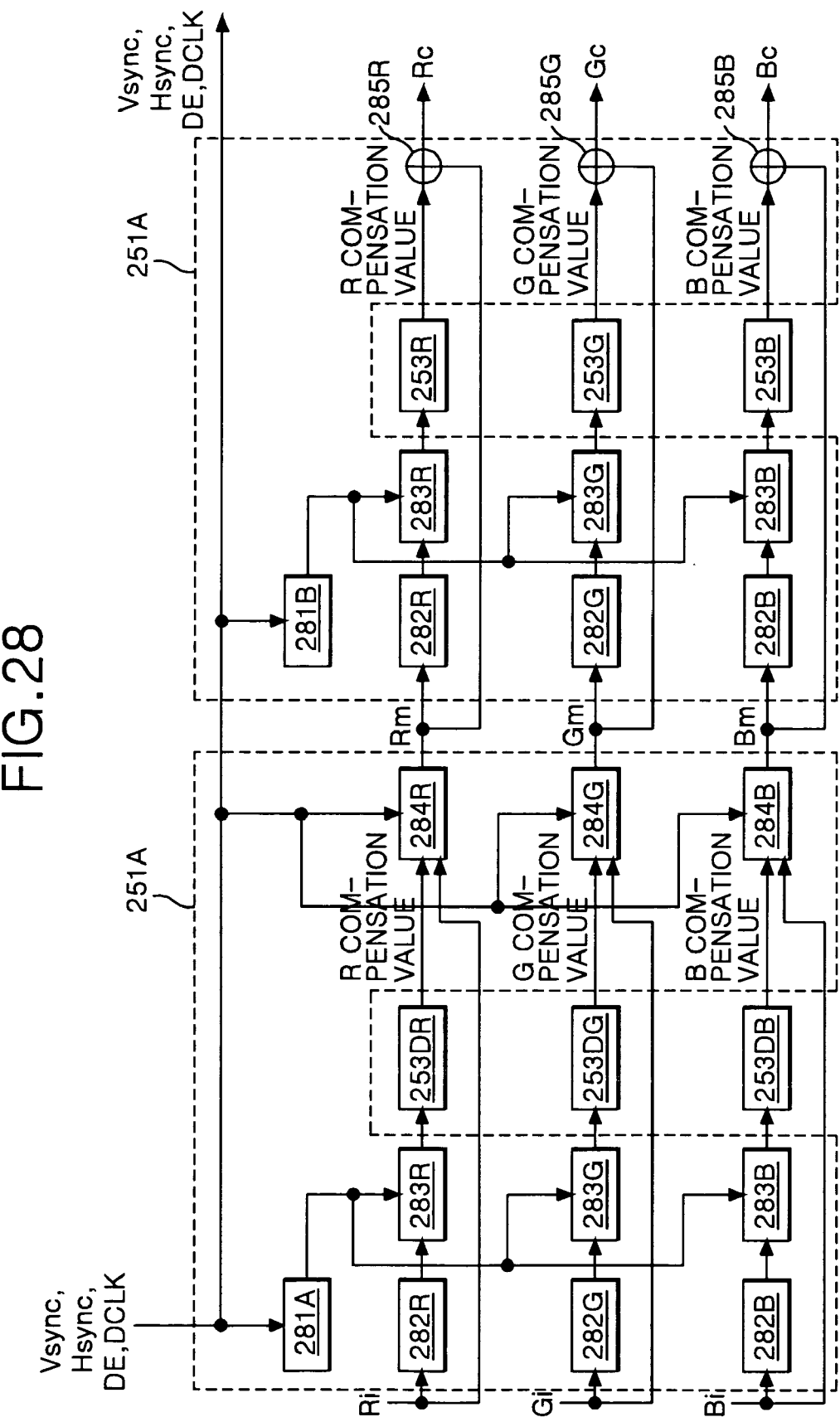
FIG. 28 is a block diagram illustrating a second embodiment for the compensating part shown in FIG. 25.

Referring to FIG. 28, the compensating part 251 according to the second embodiment of the present invention includes a first compensating part 251A which modulates the input digital video data Ri/Gi/Bi that are to be supplied to the panel defect location by the dithering method using of the panel defect location data PD and the panel defect compensation data CD stored at the EEPROM 253; and a second compensating part 251B which modulates the data of the linked sub-pixel among the output data of the first compensating part 251A to the charge characteristic compensation data.

The first compensating part 251A includes a location judging part 281A, a gray level judging part 282, an address generating part 283, and a dithering controller 284. The EEPROM 253 accessed by the first compensating part 251A includes EEPROM's 253DR, 253DG, and 253DB for each of red R, green B, and blue B at which the location data PD of the panel defect area and the compensation data CD of the panel defect area are stored.

The location judging part 281A judges a display location of the input digital video data Ri/Gi/Bi by use of one or more of a vertical/horizontal synchronization signal Vsync, Hsync, a data enable signal DE, and a dot clock DCLK.

The gray level judging part 282 includes a gray level judging part 282R, 282G, and 282B for each of red R, green G and blue B. The gray level judging part 282R, 282G, and 282B analyzes the gray level of the input digital video data Ri/Gi/Bi.

The address generating part 283 includes an address generating part 283R, 283G, and 283B for each of red R, green G, and blue B. The address generating part 283R, 283G, and 283B accesses the panel defect location data stored in the EEPROM 253DR, 253DG, and 253DB, and if the display location of the input digital video data Ri/Gi/Bi determined by the location judging part 281A corresponds to a panel defect location, the address generating part 283R, 283G, 283B generates a read address for reading the panel defect compensation data of the panel defect area from the EEPROM 253DR, 253DG, and 253DB. The panel defect compensation data read from the EEPROM 253DR, 253DG, and 253DB are supplied to the dithering controller 284R, 284G, 284B in accordance with the read address.

The dithering controller 284R, 284G, and 284B spatially sub-divides the panel defect compensation data from the EEPROM 253DR, 253DG, and 253DB over each of a plurality of pixels of the unit pixel window thereby modulating the input digital video data Ri/Gi/Bi to be displayed at the panel defect location.

Figure 29:
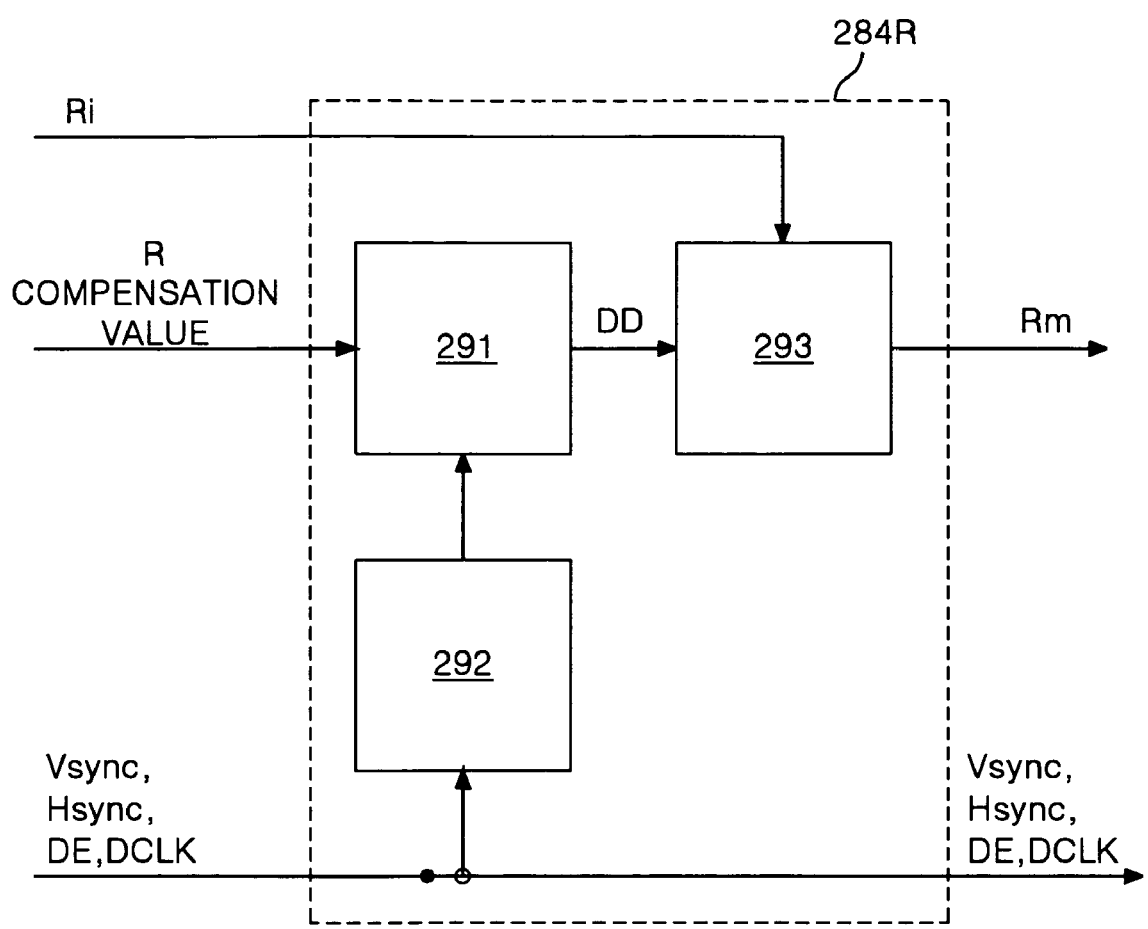
FIG. 29 is a block diagram illustrating a dithering controller shown in FIG. 28.

FIG. 29 illustrates details of a first dithering controller 284R for red data. The second and third dithering controllers 284G and 284B for green and red data substantially have the same circuit configuration as the first dithering controller 284R.

Referring to FIG. 29, the first dithering controller 284R includes a compensation value judging part 291, a pixel location sensing part 292 and an operator 293.

The compensation value judging part 291 judges the R compensation value and generates dithering data DD with a value which is to be divided into the pixels included in the unit pixel window. The compensation value judging part 291 is programmed to automatically output the dithering data DD in accordance with the R compensation value. For example, the compensation value judging part 291 generates '1' as the dithering data DD at one pixel location within the unit pixel window if four pixels are included in the unit pixel window and the R compensation value is '01' and '0' is generated as the dithering data DD in the remaining three pixel locations in case that the dithering compensation value is pre-programmed to recognize that the compensation value of the unit pixel window is ¼ gray level if the R compensation value expressed as a binary data is '00', the compensation value is ½ gray level if the R compensation value is '10', and the compensation value is ¾ gray level if the R compensation value is '11'.

Figure 19:
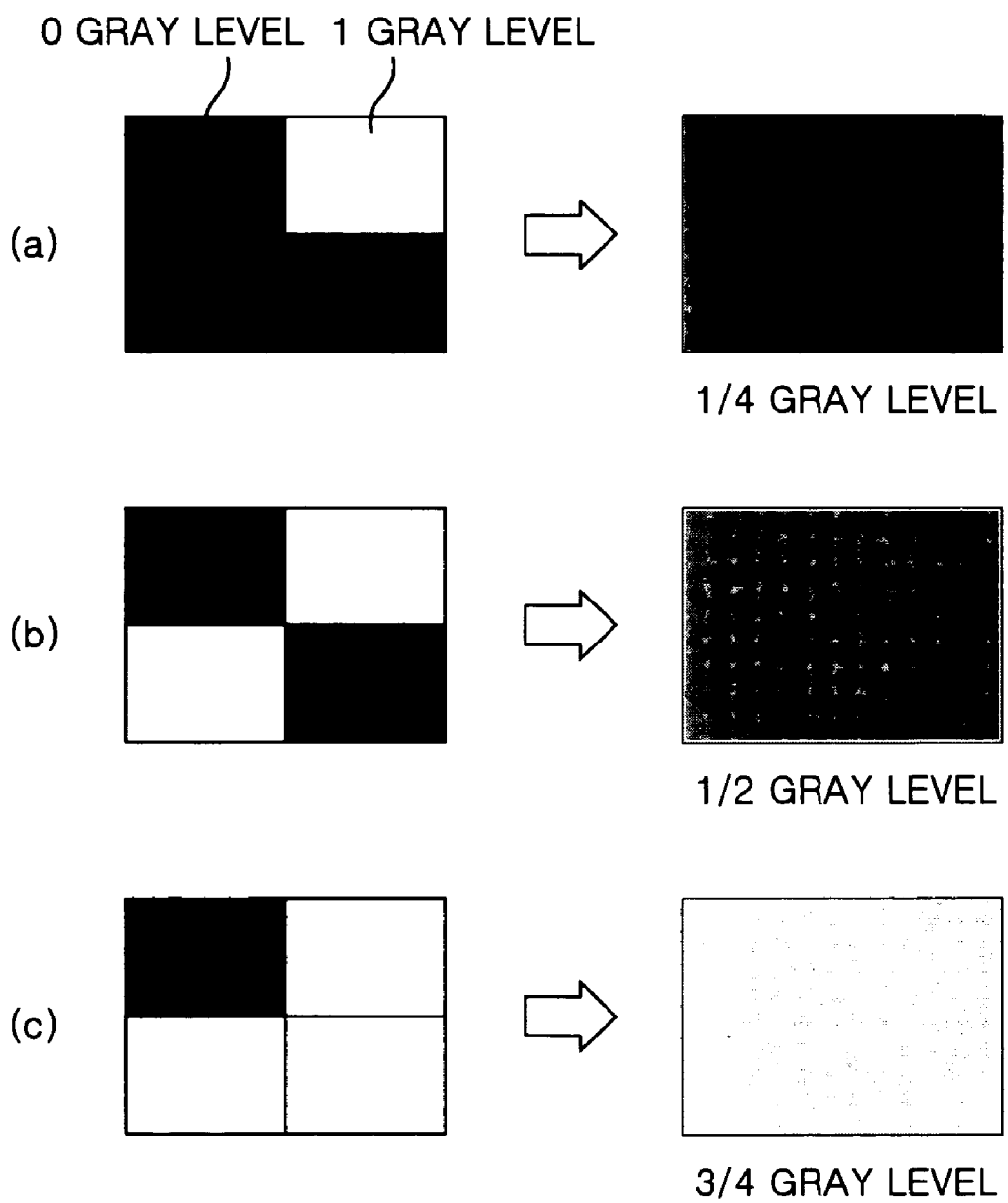
FIG. 19 is a diagram presenting an example of a dithering method.
Figure 20:
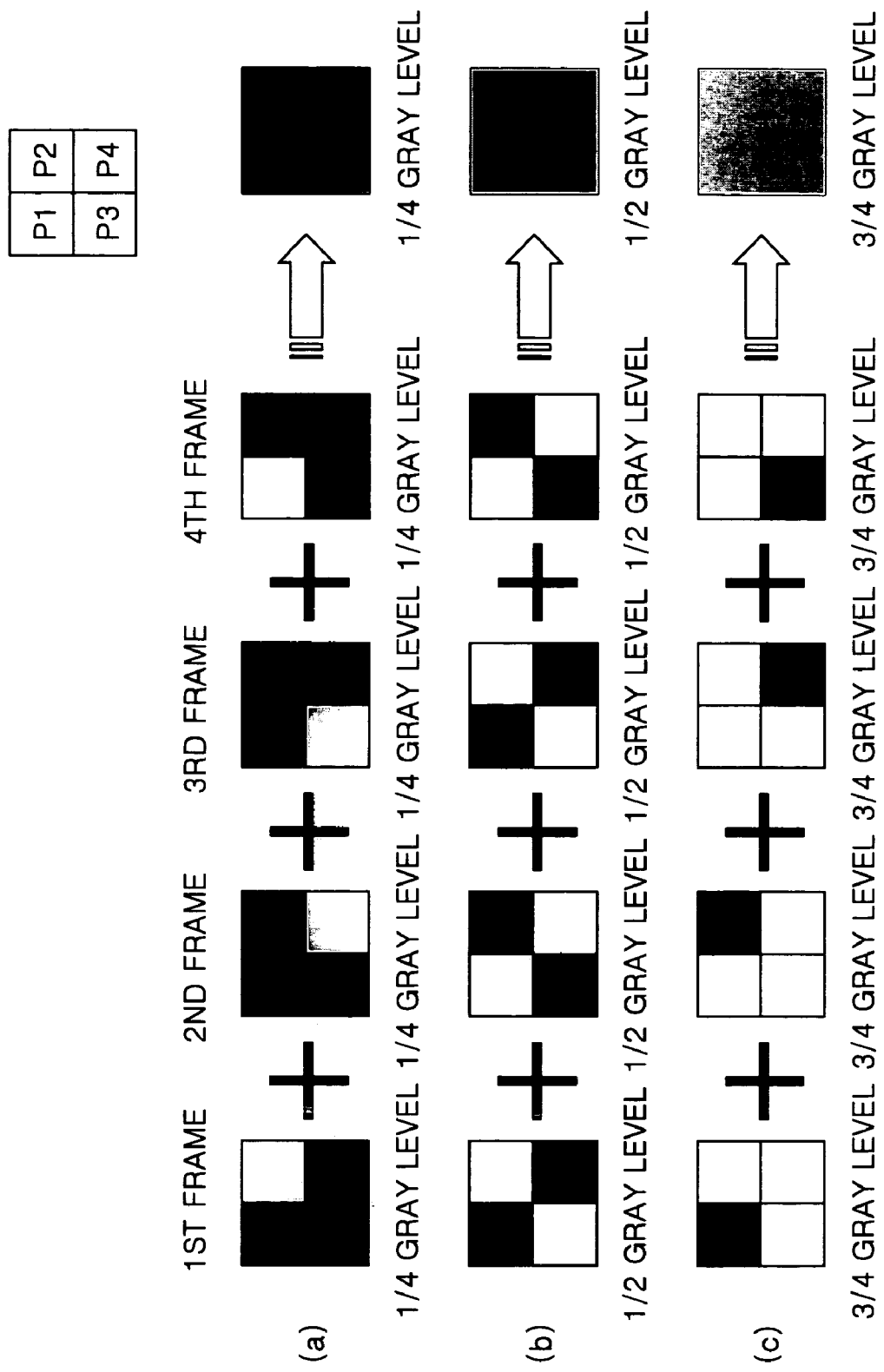
FIG. 20 is a diagram presenting an example of a mixed method of the frame rate control method and the dithering method.

The dithering data DD is increased to or decreased from the input digital video data as shown in FIG. 19 by the operator 293 for each pixel location within the unit pixel window.

The pixel location sensing part 292 senses the pixel location by use of any one or more of the vertical/horizontal synchronization signal Vsync, Hsync, the dot clock DCLK and the data enable signal DE. For example, the pixel location sensing part 292 can sense the pixel location by counting the horizontal synchronization signal Hsync and the dot clock DCLK.

The operator 293 generates the corrected digital video data Rm by increasing or decreasing the input digital video data Ri/Gi/Bi using the dithering data DD.

The input digital video data Ri/Gi/Bi to be corrected and the panel defect compensation data CD are each supplied through a different data transmission circuit to the dithering controller 284R, 284G, 284B, or the input digital video data Ri/Gi/Bi to be corrected and the panel defect compensation data CD are combined to be supplied through the same circuit. For example, in case that the input digital video data Ri/Gi/Bi to be corrected are '01000000' being 8 bits and the panel defect compensation data CD is '011' being 3 bits, it is possible that the '01000000' and '011' are each supplied to the dithering controller 284R, 284G, 284B through the different data transmission circuit or are combined to be '01000000011' of 11 bits to be supplied to the dithering controller 284R, 284G, 284B. In this way, in case that the input digital video data Ri/Gi/Bi to be corrected and the panel defect compensation data CD are combined to be 11 bit data so as to be supplied to the dithering controller 284, the dithering controller 284R, 284G, 284B recognizes the upper 8 bits of the 11 bit data as the input digital video data Ri/Gi/Bi to be corrected and recognizes the lower 3 bits as the panel defect compensation data CD, thereby performing the dithering. On the other hand, as one example of a method of generating the data of '01000000011' being the combination of '01000000' and '011', there is a method that a dummy bit of '000' is added to the lower bit of '01000000' to convert into '01000000000', and the data of '01000000011' are generated by adding '011' thereto.

As described above, the first compensation part 251A according to the second embodiment of the present invention can finely adjust the data which are to be displayed at the panel defect location with the compensation value subdivided into 1021 gray levels for each of R, G, and B when assuming that the unit pixel window is composed of four pixels.

The second compensating part 251B generates corrected digital video data Rc/Gc/Bc by increasing or decreasing the data of the linked sub-pixel included in the digital video data Rm/Gm/Bm modified by the first compensating part 251A or the data of the linked sub-pixel which by-passes so as not to be modulated. The second compensating part 251B includes a location judging part 281B, a gray level judging part 282, an address generating part 283, and an operator 285. The EEPROM 253 referred by the second compensating part 251B includes EEPROM's 253R, 253G, 253B for each of red R, green B, and blue B in which the charge characteristic compensation data CD and the location data PD of the linked sub-pixel are stored.

The location judging part 281B judges a display location on the display panel 103 of the input digital video data Ri/Gi/Bi by use of a vertical/horizontal synchronization signal Vsync, Hsync, a data enable signal DE, and a dot clock DCLK.

The gray level judging part 282 includes a gray level judging part 282R, 282G, 282B for each of red R, green G and blue B. The gray level judging part 282R, 282G, 282B analyzes the gray level for each of the output data Rm/Gm/Bm of the first compensation data 251.

The address generating part 283 includes an address generating part 283R, 283G, 283B for each of red R, green G, and blue B. The address generating part 283R, 283G, 283B accesses the location data of the linked sub-pixel stored at the EEPROM 253R, 253G, 253B and the judging result of the location judging part 281B, and if the display location of the digital video data inputted from the gray level judging part 282 corresponds to the location of the linked sub-pixel, the address generating part 283R, 283G, 283B generates a read address for reading the charge characteristic compensation data in the linked sub-pixel to supply to the EEPROM 253R, 253G, 253B. The charge characteristic compensation data outputted from the EEPROM 253R, 253G, and 253B are supplied to the operator 285R, 285G, and 285B in accordance with the read address.

The operator 285 includes an operator 285R, 285G, and 285B for each of red R, green G, and blue B. The operator 285R, 285G, and 285B modulates the input digital video data Ri/Gi/Bi which are to be displayed at the normal sub-pixel 11 included in the linked sub-pixel 13 by adding or subtracting the charge characteristic compensation data to or from the input digital video data Ri/Gi/Bi. The operator 285R, 285G, and 285B might include a multiplier or divider for doing multiplication and division on the input digital video data by the charge characteristic compensation data as an alternative to the adder and subtractor.

The digital video data Rc, Gc, Bc having been modulated by the foregoing first and second compensating parts 251A and 251B and in which the panel defect and/or charge characteristic are compensated are supplied to the display panel 203 as corrected digital video data through the drive circuit 210 to display a picture having corrected the picture quality.

Figure 30:
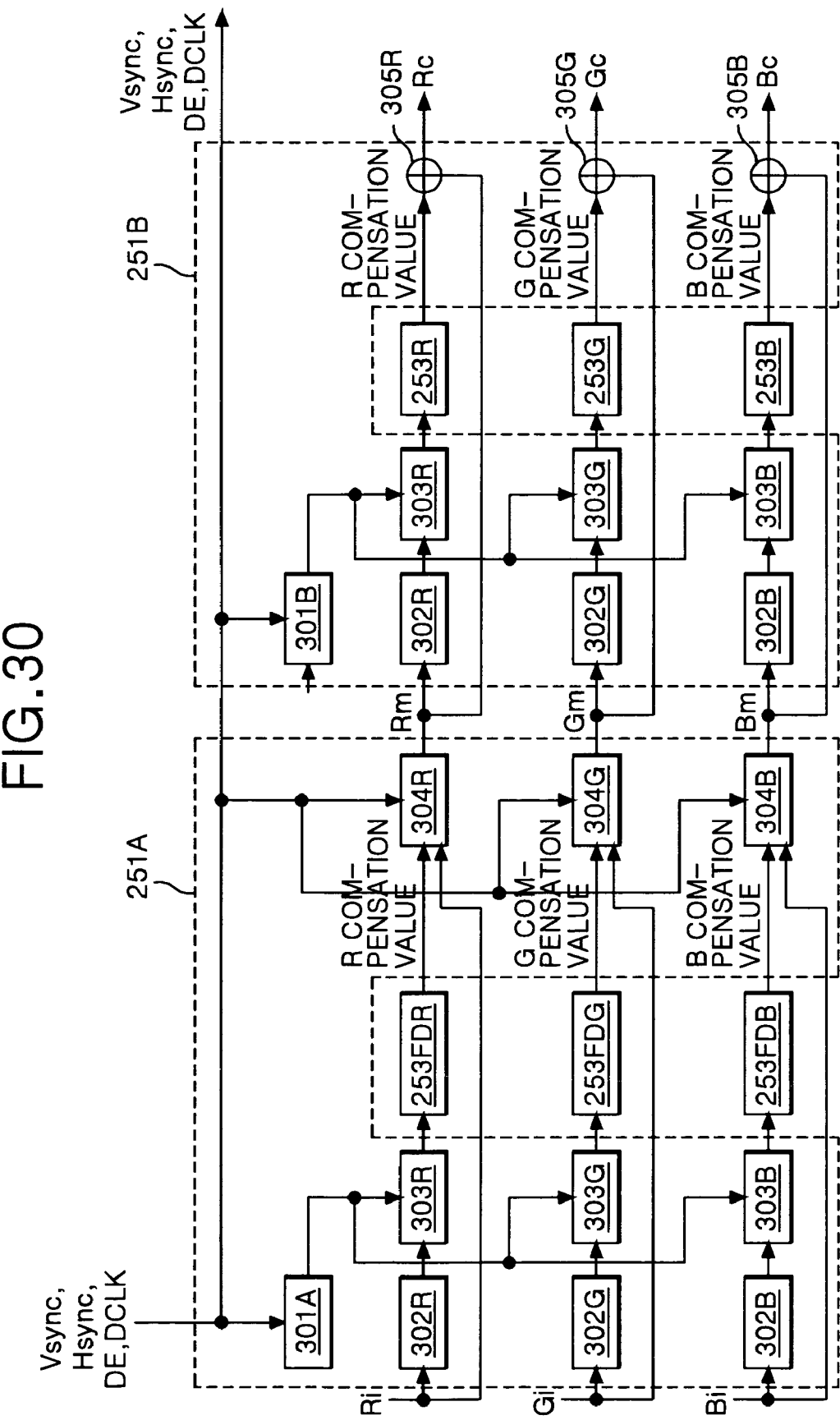
FIG. 30 is a block diagram illustrating a third embodiment for the compensating part shown in FIG. 25.

Referring to FIG. 30, the compensating part 251 according to the third embodiment of the present invention includes a first compensating part 251A which modulates the input digital video data Ri/Gi/Bi that are to be supplied to the panel defect location by the FRC and dithering method by use of the panel defect location data PD and the panel defect compensation data CD stored at the EEPROM 253; and a second compensating part 251B which modulates the data of the linked sub-pixel in the digital video data inputted through the first compensating part 251A to the charge characteristic compensation data.

The first compensating part 251A includes a location judging part 301, a gray level judging part 302, an address generating part 303, and a FRC and dithering controller 304. On the other hand, the EEPROM 253 accessed by the first compensating part 351A includes EEPROM's 253FDR, 253FDG, and 253FDB for each of red R, green B, and blue B at which the panel defect location data PD and the panel defect compensation data CD are stored.

The location judging part 301 judges the display location on the display panel 103 for the input digital video data Ri/Gi/Bi by use of a vertical/horizontal synchronization signal Vsync, Hsync, a data enable signal DE, and a dot clock DCLK.

The gray level judging part 302 includes a gray level judging part 302R, 302G, and 302B for each of red R, green G and blue B data. The gray level judging part 302R, 302G, and 302B analyzes the gray level of the input digital video data Ri/Gi/Bi.

The address generating part 303 includes an address generating part 303R, 303G, and 303B for each of red R, green G, and blue B. The address generating part 303R, and 303G, 303B accesses the panel defect location data of the EEPROM 253FDR, 253FDG, and 253FDB and the judging result of the location judging part 301, and if the display location of the digital video data Ri/Gi/Bi corresponds to a panel defect location, the address generating part 303R, 303G, 303B generates a read address for reading the panel defect compensation data of the panel defect area from the EEPROM 253FDR, 253FDG, and 253FDB. The panel defect compensation data read from the EEPROM 253FDR, 253FDG, and 253FDB using the read address are supplied to the FRC and dithering controller 304R, 304G, and 304B.

The FRC and dithering controller 304R, 304G, 304B spatially divides the panel defect compensation data from the EEPROM 253FDR, 253FDG, 253FDB to each of the pixels of the unit pixel window which include a plurality of pixels and also divides the panel defect compensation data to a plurality of frame periods, thereby modulating the input digital video data Ri/Gi/Bi which are to be displayed at the panel defect location.

FIG. 31 represents a first FRC and dithering controller 304R for red data in detail. The second and third FRC and dithering controllers 304G and 304B for green and blue data have substantially the same circuit configuration as the first FRC and dithering controller 304R.

Referring to FIG. 31, the first FRC and dithering controller 304R includes a compensation value judging part 311, a frame number sensing part 313, the pixel location sensing part 314 and an operator 312.

The compensation value judging part 311 judges the R compensation value and generates FRC and dithering data FDD using a value to be divided into the pixels included in the unit pixel window for a plurality of frame periods. The compensation value judging part 311 is programmed to automatically output the FCR and dithering data FDD in accordance with the R compensation value. For example, the compensation value judging part 311 may be programmed in advance to recognize as the compensation value for 0 gray level if the R panel defect compensation data is '00', for ¼ gray level if the R panel defect compensation data is '01', for ½ gray level if the R panel defect compensation data is '10', and for ¾ gray level if the R panel defect compensation data is '11'. The compensation value judging part 311 generates '1' as the FRC and dithering data FDD at one pixel location within the unit pixel window for four frame periods and generates '0' as the FRC and dithering data FDD in the remaining three pixel locations, but the location of the pixel at which '1' is generated is changed every frame, as in FIG. 15, when assuming that the R panel defect compensation data is '01', and four frame periods is taken as the FRC frame group and four pixels constitute the unit pixel window of the dithering.

The frame number sensing part 313 senses the number of the frame by use of any one or more of the vertical/horizontal synchronization signal Vsync, Hsync, the dot clock DCLK, and the data enable signal DE. For example, the frame number sensing part 313 can sense the number of the frame by counting the vertical synchronization signal Vsync.

The pixel location sensing part 314 senses the pixel location by use of any one or more of the vertical/horizontal synchronization signal Vsync, Hsync, the dot clock DCLK and the data enable signal DE. For example, the pixel location sensing part 314 can sense the pixel location by counting the horizontal synchronization signal Hsync and the dot clock DCLK.

The operator 312 generates the corrected digital video data Rm by increasing or decreasing the input digital video data Ri/Gi/Bi using the FRC and dithering data FDD.

The input digital video data Ri/Gi/Bi to be corrected and the panel defect compensation data CD may each be supplied through a different data transmission circuits to the FRC and dithering controller 304R, 304G, and 304B, or the input digital video data Ri/Gi/Bi to be corrected and the panel defect compensation data CD may be combined to be supplied through the same circuit. For example, in case that the input digital video data Ri/Gi/Bi to be corrected are '01000000' being 8 bits and the panel defect compensation data CD is '011' being 3 bits, as in TABLE 1, it is possible that the '01000000' and '011' are each supplied to the FRC and dithering controller 304R, 304G, 304B through different data transmission circuits or that they are combined to be '01000000011' of 11 bits to be supplied to the FRC and dithering controller 304R, 304G, and 304B by a single transmission circuit. If the input digital video data Ri/Gi/Bi to be corrected and the panel defect compensation data CD are to be combined to be 11 bit data for supply to the dithering controller 284, the FRC and dithering controller 304R, 304G, 304B recognizes the upper 8 bits of the 11 bit data as the input digital video data Ri/Gi/Bi to be corrected and recognizes the lower 3 bits as the panel defect compensation data CD, thereby performing the FRC and dithering. As one example of a method of generating the data of '01000000011' being the combination of '01000000' and '011', a dummy bit of '000' may be appended as the lower bits of '01000000' to convert into '01000000000', and the data of '01000000011' may be generated by adding '011' thereto.

As described above, the first compensation part 251A according to the third embodiment of the present invention can finely adjust the data which are to be displayed at the panel defect location with the compensation value sub-divided into 1021 gray levels without any flicker and resolution deterioration for each of R, G, B when assuming that the unit pixel window is composed of four pixels and four frame periods are one FRC frame group.

The second compensating part 251B generates the corrected digital video data Rc/Gc/Bc by increasing or decreasing the data of the linked sub-pixel included in the digital video data Rm/Gm/Bm modified by the first compensating part 251A or the data of the linked sub-pixel which by-passes so as not to be modulated. The second compensating part 251B includes a location judging part 301B, a gray level judging part 302, an address generating part 303, and an operator 305.

The EEPROM 253 referred by the second compensating part 251B includes EEPROM's 253R, 253G, 253B for each of red R, green B, and blue B at which the charge characteristic compensation data CD of the linked sub-pixel and the location data PD of the linked sub-pixel are stored.

The location judging part 301B judges a display location on the display panel 103 of the input digital video data Ri/Gi/Bi by use of a vertical/horizontal synchronization signal Vsync, Hsync, a data enable signal DE, and a dot clock DCLK.

The gray level judging part 302 includes a gray level judging part 302R, 302G, and 302B for each of red R, green G and blue B data. The gray level judging part 302R, 302G, and 302B analyzes the gray level of the input digital video data Ri/Gi/Bi.

The address generating part 303 includes an address generating part 303R, 303G, and 303B for each of red R, green G, and blue B. The address generating part 303R, 303G, and 303B compares the location data of the linked sub-pixel stored at the EEPROM 253R, 253G, and 253B with the judging result of the location judging part, and if the display location of the digital video data rm/Gm/Bm inputted from the first compensating part 252B corresponds to the linked sub-pixel 13, the address generating part 303R, 303G, and 303B generates a read address for reading the charge characteristic compensation data in the linked sub-pixel 13 to supply to the EEPROM 253R, 253G, and 253B. The charge characteristic compensation data outputted from the EEPROM 253R, 253G, and 253B are supplied to the operator 305R, 305G, and 305B in accordance with the read address.

The operator 305 includes an operator 305R, 305G, and 305B for each of red R, green G, and blue B. The operator 305R, 305G, and 305B modulates the digital video data Rm/Gm/Bm which are to be displayed at the normal sub-pixel 11 included in the linked sub-pixel 13 by adding or subtracting the charge characteristic compensation data to or from the input digital video data Ri/Gi/Bi using an adder or a subtractor. Alternatively the operator 305R, 305G, and 305B might include a multiplier or divider for performing multiplication and division on the input digital video data using the charge characteristic compensation data, in lieu of the adder and subtractor.

The digital video data Rc, Gc, Bc which is modulated by the foregoing first and second compensating part 251A, 251B and of which the panel defect and/or charge characteristic are compensated, i.e., the corrected digital video data Rc, Gc, Bc are supplied to the display panel 203 through the drive circuit 210 to display a picture of which the picture quality is corrected.

The flat panel display device and the fabricating method thereof, the picture quality controlling method and apparatus according to the present invention has been explained using a liquid crystal display device as an example, however the invention may be similarly applied to e other flat panel display devices such as an active matrix organic light emitting diode OLED.

As described above, embodiments of the present invention includes a repair process and a compensation circuit to reduce the degree of naked eye perceptibility of defective pixels and it is possible to eliminate a display spot resulting from a panel defect. Further, embodiments of the present invention allow fine correct of brightness in the panel defect location and the defective pixel by use of the frame rate control and dithering method to sub-divided the unit gray level expression for compensating for a panel defect.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A flat panel display device, comprising:
   a display panel having a link pixel including a defective pixel electrical connected to an adjacent normal pixel, wherein the normal pixel adjacent to the defective pixel is a pixel of the same color as the defective pixel;
   a memory to store: first location data describing the location of a panel defect area of the display panel having a brightness difference in comparison to a normal area of the display driven with the same data as the panel defect area; panel defect compensation data to compensate for the brightness difference of the panel defect area; second location data describing a location of the link pixel; and charge characteristic compensation data to compensating for a charge characteristic of the link pixel;
   a first compensating part to modulate data to be supplied to the panel defect area using a frame rate control dithering method, the first location data and the panel defect compensation data; and
   a second compensating part modulate a charge characteristic of a digital video data to be displayed at the link pixel among data output from the first compensating part using the charge characteristic compensation data,
   wherein the first compensating part is to temporally sub-divide panel defect compensation data over a unit of a frames, to spatially sub-divide panel defect compensation data over a number of adjacent pixels, and to increase or decrease data to be displayed at the panel defect area by the spatially and the temporally divided panel defect compensation data.

2. The flat panel display device according to claim 1, wherein the second compensating part is to increase or decrease the output data from the first compensating part to be displayed at the link pixel location using charge characteristic compensation data.

3. A fabricating method of a flat panel display device, comprising:
   applying test data to the flat panel display device;
   identifying the presence of a defective pixel on the flat panel display device by detecting a difference in brightness of a panel area containing the defective pixel and a normal panel area;
   forming a link pixel by electrically connecting an identified defective pixel to a normal pixel adjacent to the identified defective pixel, wherein the normal pixel adjacent to the identified defective pixel is a pixel of the same color as the identified defective pixel;
   determining first location data that describes a location of a panel defect area, calculating a panel defect compensation data for compensating a brightness of the panel defect area, determining second location data that describes a location of the link pixel, and calculating a charge characteristic compensation data for compensating a charge characteristic of the link pixel; and storing the first and second location data the panel defect compensation data and the charge compensation data in a data modulation memory of the flat panel display device.

4. The fabricating method according to claim 3, wherein storing the panel defect compensation data includes storing the panel defect compensation data in correspondence with a gray level of the data displayed at the panel defect area and a location of the panel defect area.

5. The fabricating method according to claim 3, wherein storing the charge characteristic compensation data includes storing the charge characteristic compensation data in correspondence with a gray level of data displayed at the link pixel.

6. The fabricating method according to claim 3, wherein data modulation memory includes any one of EEPROM and EDID ROM.

7. The fabricating method according to claim 3, further comprising:

modulating a digital video data to be displayed at the link pixel by use of first and second location data and panel defect and charge compensation data stored in the data modulation memory.

8. The fabricating method according to claim 7, wherein the modulating the digital video data includes:

temporally sub-dividing the panel defect compensation data and increasing or decreasing data to be displayed at the panel defect location using the temporally sub-divided panel defect compensation data.

9. The fabricating method according to claim 8, wherein temporally sub-dividing the panel defect compensation data includes temporally sub-dividing the panel defect compensation data over a number of frames in a unit of frames.

10. The fabricating method according to claim 7, wherein the modulating the digital video data includes:

spatially sub-dividing the panel defect compensation data, and increasing or decreasing data to be displayed at the panel defect location to the panel defect compensation data that are spatially divided.

11. The fabricating method according to claim 10, wherein spatially sub-dividing the panel defect compensation data includes spatially sub-dividing the panel defect compensation data over a number of adjacent pixels.

12. The fabricating method according to claim 7, wherein the modulating the digital video data includes:

temporally sub-dividing panel defect compensation data over a number of frames in a unit of frames, spatially sub-dividing panel defect compensation data over a number of adjacent pixels, and increasing or decreasing data to be displayed at the panel defect location by the temporally and the spatially sub-divided panel defect compensation data.

13. The fabricating method according to claim 7, wherein the modulating the digital video data includes:

increasing or decreasing data to be displayed at the link pixel location using the charge characteristic compensation data.

14. The fabricating method according to claim 3, further comprising:

inspecting a picture quality defect in the flat panel display device by applying modulated digital video data to the flat panel display device;

determining a picture quality defect location data describing a location of the picture quality defect, and a picture quality defect compensation data for compensating for the picture quality defect; and storing the picture quality defect location data and the picture quality defect compensation data in a data modulation memory of the flat panel display device.

15. The fabricating method according to claim 14, wherein the picture quality defect location data described a location of a backlight bright line defect and the picture quality defect compensation data is determined as a compensation value for correcting a brightness of the backlight bright line defect.

16. The fabricating method according to claim 3, wherein the flat display device includes:

a plurality of switch devices formed at crossing of the data lines and the scan lines to supply a data signal from the data line to pixels inclusive of the link pixel.

17. The fabricating method according to claim 16, wherein the forming the link pixel includes:

opening a current path between the identified defective pixel and the switch device; and electrically connecting a pixel electrode of the identified defective pixel to a pixel electrode of a normal pixel adjacent thereto using a W-CVD process.

18. The fabricating method according to claim 16, wherein the forming the link pixel includes:

forming a link pattern overlapped with a pixel electrode of the identified defective pixel and a pixel electrode of a normal pixel adjacent, the link pattern insulated from pixel electrode of the identified defective pixel and a pixel electrode of a normal pixel by an insulating film;

opening a current path between the identified defective pixel and the switching device; and irradiating a laser light to opposite sides of the link pattern to electrically connect the pixel electrode of the defective pixel and the pixel electrode of the normal pixel adjacent thereto using the link pattern as a connecting medium.

19. The fabricating method according to claim 18, wherein the link pattern is formed together with the scan line in the same layer as the scan line.

20. The fabricating method according to claim 19, wherein the link pattern is connected to the scan line.

21. The fabricating method according to claim 20, further comprising:

separating the link pixel and the scan line from each other.

22. The fabricating method according to claim 18, wherein the link pattern is formed together with the data line in the same layer as the data line.

23. A picture quality controlling method of a flat panel display device, comprising:

forming a link pixel by electrically connecting to a defective pixel to a normal pixel adjacent thereto in a display panel of a flat panel display device, wherein the normal pixel adjacent to the defective pixel is a pixel of the same color as the defective pixel;

determining first location data describing the location of a panel defect area having a brightness difference in comparison with a normal area, a panel defect compensation data for compensating a brightness to be displayed at the panel defect area, second location data describing a location of the link pixel, and a charge characteristic compensation data for compensating a charge characteristic of the link pixel;

storing the location data and the compensation data in a data modulation memory of the flat panel display; and modulating data to be displayed at the panel defect area with a frame rate control dithering method and modulating a charge characteristic of the digital video data to be displayed at the link pixel, by use of the first and second location data and the panel defect and charge compensation data stored in the data modulation memory, wherein modulating the digital video data includes:

temporally sub-dividing the panel defect compensation data over a number of frames in a unit of frames and to spatially sub-dividing the panel defect compensation data over a number of adjacent pixels, and increasing or decreasing data to be displayed at the panel defect area by the temporally sub-divided panel defect compensation data and the spatially sub-divided panel defect compensation data.

24. The picture quality controlling method according to claim 23, wherein modulating the digital video data includes:

increasing or decreasing the data to be displayed at the link pixel location using the charge characteristic compensation data.

25. The picture quality controlling method according to claim 23, further comprising:

inspecting a picture quality defect in the flat panel display device by applying the modulated digital video data to the flat panel display device;

determining a picture quality defect location data that indicates a location of the picture quality defect and a picture quality defect compensation data for compensating the picture quality defect; and storing the picture quality defect location data and the picture quality defect compensation data in a data modulation memory of the flat panel display device.

26. The picture quality controlling method according to claim 25, wherein the picture quality defect location data indicates a backlight bright line defect location and the picture quality defect compensation data is determined as a compensation value for correcting the brightness of the backlight bright line defect.

27. A picture quality controlling apparatus of a flat panel display device, comprising;

a memory to store first location data describing a location of a link pixel formed by electrically connecting to a defective pixel to a normal pixel adjacent thereto in a display panel of the flat panel display device, a charge characteristic compensation data for compensating a charge characteristic of the link pixel, second location data describing the location of a panel defect area having a brightness difference in comparison with a normal area which is displayed with a normal brightness in the display panel, and a compensation data for the panel defect area, wherein the normal pixel adjacent to the defective pixel is a pixel of the same color as the defective pixel;

a first compensating part to sub-divide the panel defect compensation data with a frame rate control dithering method and to modulate the data to be displayed at the panel defect area using the sub-divided panel defect compensation data; and a second compensating part to modulate the data to be displayed at the link pixel among data output by the first compensating part with the charge characteristic compensation data, wherein the first compensating part temporally sub-divides the panel defect compensation data over a number of frames in a unit of frames and spatially sub-divides the panel defect compensation data over a number of adjacent pixels, and increases or decreases the data to be displayed at the panel defect area by the temporally sub-divided panel defect compensation data and the spatially sub-divided the panel defect compensation data.

28. The picture quality controlling apparatus according to claim 27, wherein the second compensating part increases or decreases the modulated digital video data to be displayed at the link pixel location using the charge characteristic compensation data.

* * * * *